(12) United States Patent
Haas

(10) Patent No.: US 11,320,288 B2
(45) Date of Patent: *May 3, 2022

(54) INDUCTION MACHINES

(71) Applicant: Peter Haas, Struttgart (DE)

(72) Inventor: Peter Haas, Struttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/145,278

(22) Filed: Jan. 8, 2021

(65) Prior Publication Data

US 2021/0348950 A1 Nov. 11, 2021

Related U.S. Application Data

(63) Continuation of application No. 16/309,115, filed as application No. PCT/EP2017/000690 on Jun. 13, 2016, now Pat. No. 11,156,480.

(30) Foreign Application Priority Data

Jun. 14, 2016 (DE) ........................ 20 2016 003727.8

(51) Int. Cl.
*G01D 5/14* (2006.01)
*G01D 5/20* (2006.01)
(Continued)

(52) U.S. Cl.
CPC ........... *G01D 5/2291* (2013.01); *G01D 5/204* (2013.01); *G01D 5/206* (2013.01); *G01D 5/2053* (2013.01);
(Continued)

(58) Field of Classification Search
CPC ............ G01D 5/14; G01D 5/145; G01D 5/20; G01D 5/22
See application file for complete search history.

(56) References Cited

FOREIGN PATENT DOCUMENTS

EP 2428773 A1 * 3/2012 ........... G01D 5/2073

* cited by examiner

*Primary Examiner* — Neel D Shah
(74) *Attorney, Agent, or Firm* — IP Pundit LLC

(57) ABSTRACT

The invention relates to a novel type of electric inductance arrangement for a series of applications in the field of distance measurement, sensor-based detection of objects, and construction of induction machines. The novelty consists in the type of inductance arrangement of the receiver or transmitter coil, said arrangement being designed in the form of a ladder rung arrangement, wherein the ladder spars short-circuit the rungs. The sum of all the short-circuit currents is an indicator of what is occurring in the surroundings of the arrangement. This could be changing magnetic fields caused by transmitter objects or additional ladder-rung systems acting as transmitters. Multiple such sensors and transmitters can be designed in the ladder-rung form, said sensors and transmitters being connected in parallel or in series according to the application under certain circumstances and if necessary assuming the excitation function by moving a conductor through which a direct current is flowing or by applying alternating currents. The aforementioned inductance arrangement results positively in that the coils can all have a completely crossover-free design and are therefore substantially simpler to technically implement for very different applications in electrical engineering. The applicability ranges from short-range distance measuring devices and long-range object location to light detection and efficient induction machines with large or also very small constructions.

9 Claims, 20 Drawing Sheets

(51) Int. Cl.
*G01D 5/22* (2006.01)
*H01F 27/28* (2006.01)
*H01F 5/00* (2006.01)
*H02K 11/20* (2016.01)
*H01F 27/24* (2006.01)

(52) U.S. Cl.
CPC ............ *H01F 5/00* (2013.01); *H01F 27/24* (2013.01); *H01F 27/28* (2013.01); *H02K 11/20* (2016.01); *G01D 5/20* (2013.01)

System of Maxwell's Equations

Law of Magnetic Flux $\quad rot\ \vec{H} = \vec{J} + \dfrac{\partial \vec{D}}{\partial t}$ (1)

Law of Induction $\quad rot\ \vec{E} = -\dfrac{\partial \vec{B}}{\partial t}$ (2)

$\quad div\ \vec{D} = \rho$ (3)

$\quad div\ \vec{B} = 0$ (4)

ε: Permittivity $\quad \vec{D} = \varepsilon\ \vec{E}$ (5)

μ: Permeability $\quad \vec{B} = \mu\ \vec{H}$ (6)

γ: Conductivity $\quad \vec{J} = \gamma(\vec{E} + \vec{v} \times \vec{B})$ (7)

Fig. 1

Quasi-stationary Electromagnetic Fields

Field formation in areas with current displacement

Special case: time-dependent alterations: $\quad |\vec{J}| \gg \left|\dfrac{\partial D}{\partial t}\right|$ (8)

With $rot\ \vec{H} = \vec{J},\ \vec{H} = \dfrac{1}{\mu} \vec{B},\ \vec{B} = rot\ \vec{A}$ results $$\dfrac{1}{\mu} rot\ rot\ \vec{A} = \vec{J} \quad (9)$$

In addition, by Coulomb calibration $$div\ \vec{A} = 0 \quad (10)$$

the vector identity $rot\ rot\ \vec{A} = grad\ div\ \vec{A} - \Delta \vec{A}$ and the Coulomb calibration give $$\Delta \vec{A} = -\mu\ \vec{J} \quad (11)$$

Fig. 2

| Voltage Range | Current Range |
|---|---|
| A1: Generator | B1: Sensor |

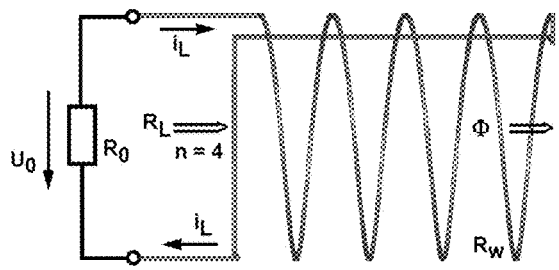 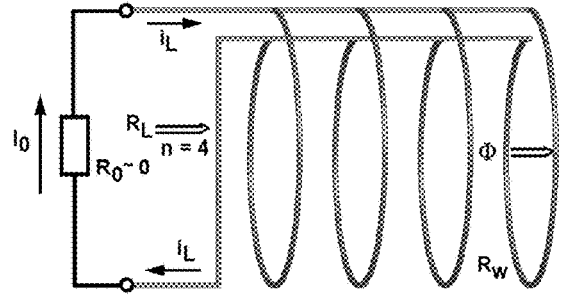

$$U_0 = -R_0 \cdot i_L$$

$$U_0 = \sum_{k=1}^{n} \frac{d\Phi_k}{dt} = n \cdot \frac{d\Phi}{dt} \quad (12)$$

$$I_0 = i_L$$

$$I_0 = -\sum_{k=1}^{n} \frac{1}{R_{wk}} \cdot \frac{d\Phi_k}{dt} \quad (13)$$

$$= -\frac{n}{R_w} \cdot \frac{d\Phi}{dt}$$

Flat Circuit

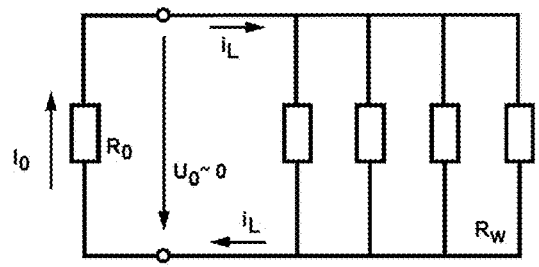

Fig. 16

A2: Motor

B2: Field Source (Induction Generator)

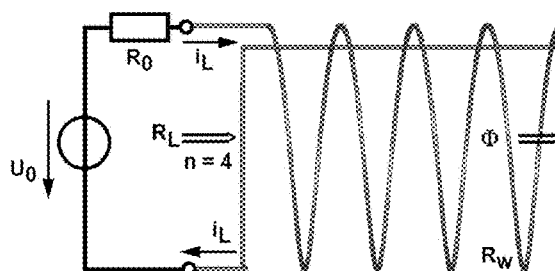 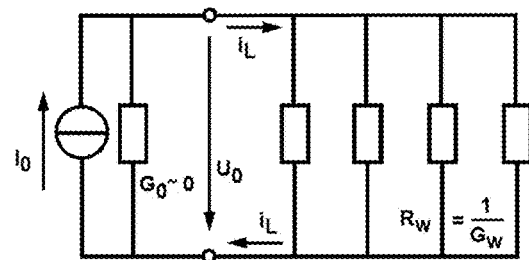

$$U_0 = R_0 \cdot i_L + L \cdot \frac{di}{dt} \quad (14a)$$

$$U_0 = R_0 \cdot i_L + n \cdot \frac{d\Phi}{dt} \quad (14b)$$

$$I_0 = -n \cdot G_w \cdot \frac{d\Phi}{dt} \quad (15a)$$

$$U_0 = n \cdot \frac{d\Phi}{dt} \quad (15b)$$

| | Phase | Turns | In Slot | Out Slot |
|---|---|---|---|---|
| Coil_1 | B | 40 | 1T | 12T |
| Coil_2 | B | 33 | 2T | 11T |
| Coil_3 | B | 23 | 3T | 10T |
| Coil_4 | B | 12 | 4T | 9T |
| Coil_5 | B | 0 | 5T | 8T |
| Coil_6 | B | 0 | 6T | 7T |
| Coil_7 | A | 50 | 6B | 19B |
| Coil_8 | A | 46 | 5B | 20B |
| Coil_9 | A | 40 | 4B | 21B |
| Coil_10 | A | 29 | 3B | 22B |
| Coil_11 | A | 10 | 2B | 23B |
| Coil_12 | A | 0 | 1B | 24B |

INDUCTION MACHINES

CROSS REFERENCE TO RELATED APPLICATIONS

This application is a CONTINUATION application of U.S. application Ser. No. 16/309,115, filed Dec. 12, 2019, which is a national phase application under 35 U.S.C. § 371 of International Application No. PCT/EP2017/000690, filed on Jun. 13, 2017, which claims priority to German Patent Application No. 20 2016 003 727.8, filed on Jun. 14, 2016; the disclosures of all of which are hereby incorporated by reference in their entirety.

TECHNICAL FIELD

The invention relates to a method for more efficient use of inductances in electrical engineering. Induction arises from the alteration of a magnetic field in relation to a location defined in space and was for the first time scientifically described by Michael Faraday. The reference is characterized in that one of the three-dimensional vector components of the field lines is perpendicular to a surface located in a certain location in space, the surface being enclosed by a closed line. If an electrical conductor is stretched and short-circuited along this line, then a current is induced by the changing magnetic field in this conductor. The change of the field can be done by different measures. One of these many possibilities is, for example, the movement of a permanent magnet with its static magnetic field—with spatially fixed spatial direction of the dipoles of the magnet—past the location defined in space. At this location, the magnetic flux density changes due to the movement of the magnetic field and the associated change in the strength of the magnetic field. A coil (inductance) located in this location—consisting of a current-conductive material with a round or other cross-sectional geometry, wherein the diameter of the cross section is relatively small in relation to the length of the conductor material, and additionally as a necessary condition of the conductor of the coil as above described includes an area—experiences a change in the flux density, and when one of the vector components of this flow is perpendicular to the surface described above, by changing the magnetic flux in such a surface including or enclosing conductor, an electric current will originate in the conductor, if the conductor ends of such an arrangement are closed, or an electrical voltage between the conductor ends, when the conductor ends are opened.

BACKGROUND

The relationship of the magnitudes of magnetic flux change and electric current in such a coil-shaped conductor is described by the law of induction and by Maxwell's equations, FIG. 1.

Field theory explains that electric and magnetic fields are two manifestations of the same phenomenon, so there are many ways to technically exploit the interactions of electric and magnetic fields for many different applications.

The prior art describes that one of the ways to exploit these effects technically is to use the rotary motion of a DC-powered conductor around a permanent magnet fixed in space as an example of the operation of a DC motor. After a rotation of 180° in this case, the current direction must be changed so that the rotor does not stop after half a turn.

Magnetic flux density change can also be generated by the rotation of a magnetic dipole, as well as by current-carrying closed electrical conductors with a varying current, for example by the application of an AC voltage source to a coil or inductance. The measure of the effect of an inductive arrangement has the unit [VsA$^{-1}$], called Henry or H. This measure determines together with the effective resistance of the respective conductor—given by its cross section, the specific resistance of the conductor material and its length—the ratio of current and voltage in the conductor or at defined end points of the conductor of a bobbin. A conductor of a bobbin can then be termed closed in the sense of the complete enclosure of a surface, if the ends of the conductor enclosing a surface intersect in any form whatsoever in the space. Such an overlap can also be made at the ends of a single coil turn. The number of turns of the coil in this case is n=1. When the conductor ends are closed, a loop current or short-circuit current flows in the coil when there is a change in flux when the flux vector has a component perpendicular to the surface that the conductor encloses.

Inductances in the form of conductor wire coils are used in many electrical circuits as transmitters or transformers for changing the voltage range, in electrical machines of various design and operation as DC, AC or three-phase synchronous and asynchronous machines, for rotary drives and linear drives and also measuring facilities. A typical example of a short-circuited conductor arrangement is the squirrel-cage rotor of an asynchronous machine. A typical example of measuring devices is the Rogowski coil, a coil formed in a torus-shaped manner, which diagnoses the change in current taking place in an electrical conductor, which makes it possible to measure the current intensity of an alternating current in a current-carrying conductor from the outside or the change of a direct current without having to interfere with the circuit by measuring the voltage, which could significantly affect a given electrical circuit. The aim is always to keep the measuring currents as small as possible so that mutual inductance effects do not modify the current to be measured.

However, such coils are very complex, sometimes associated with relatively complicated and correspondingly complex automatic processes or even wound by hand, and are therefore expensive to manufacture. With the emerging trend of printed circuit boards by means of respective lithography and etching methods coils proved less complex that are printed on two-dimensional layers on the thinnest and most flexible foils and arranged in space in such a way so that the coils are enabled to enclose magnetic flux according to the induction law rotE(vector)=–dB(vector)/dt. Each of these spirally printed coil assemblies has its own connections for the input and output of the coil conductor (DE 4105999).

Another example are measurement coils for the path measurement, with which stationary travel conditions can be detected when, for example, in an asymmetrically wound cylinder bobbin system of two oppositely disposed coils a metallic body is positioned, which by its presence at a certain location influences or changes the inductances of the coils. The difference of the inductances of the two coils is a measure of the positioning of, for example, a magnetizable specimen on the x-axis of a cylindrical coil arrangement, an example being EP 1 158 266 and DE 200 09 335. Such distance measurement devices or displacement sensors are used for example for the condition measurement of actuators used to sample the status of an actuator at a specific time and report it to a control system as a state variable. Among other things, this is important in control loops which need to know the current state of the adjustment of system variables, such as setting a hydraulic cylinder for controlled computerized movement of the landing flap of an aircraft on landing or the like, such as described in WO 2013/064651, measurement of the position of a pressure piston in a master cylinder.

Further developments describe asymmetric bobbins in the next step as detectors of magnetizable detectors in the near field region, the length of the asymmetric bobbin being determined by the length of the sample to be moved inside the coil and the measuring path. In the previous coil arrangements, the coil is longer than the measuring path and thus relatively long, which is why the space requirement is high.

The basics of the prior art and the use of such arrangements will be described below. FIG. 3 shows an LVDT (Linear Variable Differential Transformer) as an analog sensor for displacement measurement.

It consists of a primary coil and two secondary coils, which are applied side by side on a common winding body. In the central drilling of the winding body there is a soft magnetic material that can move freely. Advantageously, the two secondary coils are wound in opposite directions to obtain a positive or negative secondary output voltage depending on the displacement of the soft iron core. In this way, the direction of movement is clearly established. In fact, we are dealing with a voltage transformer with a path-dependent output signal. Its correct name is Linear Voltage Differential Transformer.

LVDTs are the preferred way to build linear displacement sensors for harsh industrial environments. This requires good simulation models that can handle all types of environmental disturbances. As part of the BMWi funding program PRO INNO II, precise LVDT simulation models have been developed under FKZ KU0568901RR7, which have led to significantly new findings. These simulation models are able to define a whole new class of LVDTs with improved accuracy and a length that does not significantly exceed the measurement path.

The multi-domain physics simulation system ANSYS allows, among other things, the definition and calculation of all essential fields, as they are common in electrical engineering. The basic division is made into electrical flow fields, electrostatic fields, magnetostatic fields, quasi-stationary electromagnetic fields and finally wave fields. Electric and magnetic fields are described in physics by the system of Maxwell's equations exhaustively.

In the course of the harmonic analysis, the LVDT simulation can be referred to the calculation of quasi-stationary electromagnetic fields, FIG. 2.

Finite elements describing fields of this kind must have the degree of freedom of the magnetic vector potential A (Ansys ax, ay, az), and have the material property of the permeability (in Ansys murx, mury, murz) as well as the material property of the conductivity (in Ansys electrical resistivity rsvx, rsvy, rsvz). The electromagnetic flux density is achieved by B (in Ansys bx, by, bz).

In Ansys, the structural elements PLANE13, PLANE53, SOLID97 and SOLID117 are available for the calculation of quasi-stationary electromagnetic fields. All these elements have the additional possibility of activating the freedom of the electrical scalar potential as to be able to calculate rationally different areas (conductors, insulators, dielectrics). Furthermore, the viewer is always free to use the method of transient non-linear simulation when the sensor arrangement comprises basic, for example, material-dependent non-linearities, or the sensor is subject to a translational—and/or rotational movement. In the case of displacement sensors, the latter is often the case. The computational effort increases considerably, but does not represent a fundamental hurdle.

FIG. 4 shows a half-symmetry display of an LVDT field domain including the complete external circuitry after the automatic discretization has been performed.

On the upper left side the primary voltage generator is shown, consisting of the sinusoidal voltage source V0 with coupling capacitor C0. The coupling element N0 connects the output of the discrete voltage source to the primary coil in the field domain on the right side (see FIG. 3). The lower part shows the external wiring of the secondary coils. For each of the two secondary coils S1 and S2, a coupling element N0 is used, which transmits the signals from the field domain into the discrete circuit. The measuring resistor R0 is used to form the complex differential output voltage. All discrete circuit elements are modeled with the ANSYS structure element CIRCU124. In the right half of FIG. 4 we see the LVDT embedded in its semi-circular air environment.

FIG. 5 shows a finite element-illustration of an exemplary LVDT in half-symmetry. Coding of the material assignment: soft iron core (1), stainless steel pressure tube (2), primary coil (inside) (3) and secondary coils (outside) (4) and (5), upper and lower end discs (6), housing (7), air environment (8).

The sensor characteristic U(s) provides a first impression of the sensor quality according to FIG. 6, which shows the amplitude of the complex sensor output voltage U as a function of the path coordinate s. Excel spreadsheets will provide the complex output voltage of the sensor in terms of magnitude and phase for numerical post-processing. Obviously, there is sufficient reason in this case to improve the linearity of the sensor characteristic U(s). ANSYS Goal Driven Optimization (GDO) is a way, to continuously improve the corresponding LVDT design parameters until an optimum is reached. It is also important to note that a multi-domain physics simulator, such as ANSYS, is able to reflect all sources of signal degradation individually and relate them to the appropriate components or physical phenomena. For example, the temperature drift of the sensor characteristic can be improved by more than an order of magnitude by suitable choice of materials.

FIG. 6 shows the sensor characteristic |U|(s), the amplitude of the sensor output voltage U as a function of the path coordinate s. The path characteristic is symmetrical to the origin of the coordinate system.

Of course, a high-quality simulation system will allow many more insights into the physics of the sensor function by, for example, drawing on detailed representations of the electromagnetic fields involved. FIG. 7 to 11 show an extract of the available field representations.

FIG. 7 shows the representation of the magnetic field lines for the example LVDT.

FIG. 8 shows the magnitude of the magnetic field strength HSUM [A/m] from simulation of the example LVDT.

FIG. 9 shows the magnitude of the electromagnetic flux density BSUM [T] from simulation for the example LVDT.

FIG. 10 shows the vector of the magnetic field strength H [A/m] from simulation for the example LVDT.

FIG. 11 shows the vector of the electromagnetic flux density BSUM [T] from simulation for the example LVDT.

Commercially available designs of LVDTs usually work with adjacent secondary coils, as shown in FIG. 5, for example. This design offers the obvious approach of using large numbers of turns to achieve an acceptable path resolution. The costs for this construction method are as follows: first, the overall length L is at least twice as large as the measuring path 2*H. Therefore, the LVDT cannot be installed directly in hydraulic or pneumatic cylinders. Second, the path characteristic U(s), see FIG. 6, has a pronounced nonlinearity in the region of the end discs.

This non-linearity of the path characteristic can be eliminated by a table-based operation. However, this does not change the problem that the path characteristic is influenced by external factors such as the housing.

SUMMARY

The invention is based on the idea of defining the path signal by specifying the electromagnetic flux density in space.

The new approach is to design the electromagnetic flux density in space in such a way that their distribution does not depend on the shape and size of the signal transmitter or the housing or its boundaries. This approach goes much further than the LVDT principle described above, insofar as arbitrary path coordinates in space can be detected, including local refinement by means of so-called vernier coils. These include, in addition to the simple axial two-quadrant path encoders all inductive four-quadrant path encoders, flat, cylindrical inductive angle encoders, linear combinations of the aforementioned subsystems and new applications of the magnetic far-field measurement at moderate signal frequencies.

An easy way to encode the path coordinate by means of the electromagnetic flux density, is to make the density of the electrical conductors along the path to be measured according to the desired path signal. This can be done for example by an increasing or decreasing winding density in the form of a wedge-shaped winding cross section or more generally by a progressive or degressive slope of the winding wires in all, several or a single winding layer. This coding can be done by means of one or more secondary coils, or even the primary coil, or all sub-coils together. In composite coil assemblies, e.g. four-quadrant signal transmitters further adjacent coil layers are added.

BRIEF DESCRIPTION OF DRAWINGS

FIG. 1 describes the system of Maxwell's equation.

FIG. 2 described quasi-stationary electromagnetic fields.

FIG. 16 shows the equation systems used for the transfer of voltage-guided coils into equivalent current-carrying coils.

DETAILED DESCRIPTION

Figure 12:
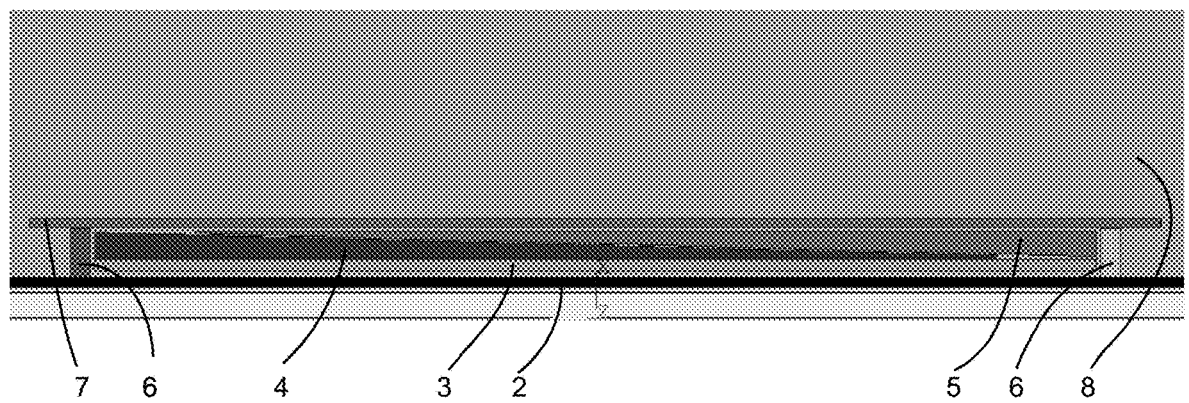
FIG. 12 shows a simple, new LVDT arrangement, which was described for the first time within the scope of the BMWi funding program PRO INNO II under FKZ KU0568901RR7.

FIG. 12 shows a simple, new LVDT arrangement, which was described for the first time within the scope of the BMWi funding program PRO INNO II under FKZ KU0568901RR7. Here, the path information is encoded by means of progressively increasing number of turns of the secondary coils. The secondary coils are symmetrical to the sensor center. The finite element representation of this LVDT with overlapping secondary coils in half-symmetry shows the cross-sectional area rendered with the material assignment: stainless steel pressure tube (2), primary coil (inside) (3) secondary coil 1 (left) (4), the secondary coil 2 (right) (5), left and right front disc (6), housing (7), air environment (8).

An essential feature of the encoded path information is that the shape and size of the signal generator is not critical for the path characteristic U(s). The size of the signal generator only has an influence on the maximum size, i.e. the amplitude of the path signal.

Figure 13:
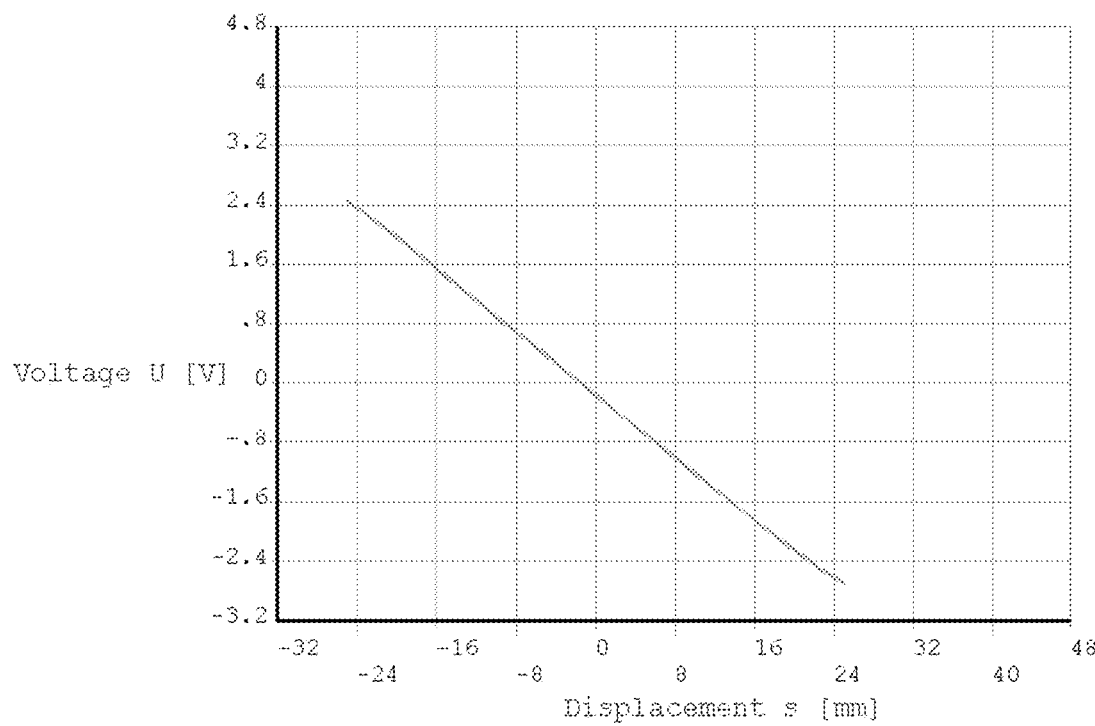
FIG. 13 shows the sensor characteristic U(s) of the inductive displacement sensor from FIG. 12 with a signal generator/construction length ratio of 0.5:1.

FIG. 13 shows the sensor characteristic U(s) of the inductive displacement sensor from FIG. 12 with a signal generator/construction length ratio of 0.5:1. The characteristic curve exhibits a zero-point offset due to its simple construction (output voltage zero does not coincide with the sensor center). This offset error can be eliminated e.g. by interlacing of the secondary coils and/or further measures, see arrangement in FIG. 15.

Figure 10:
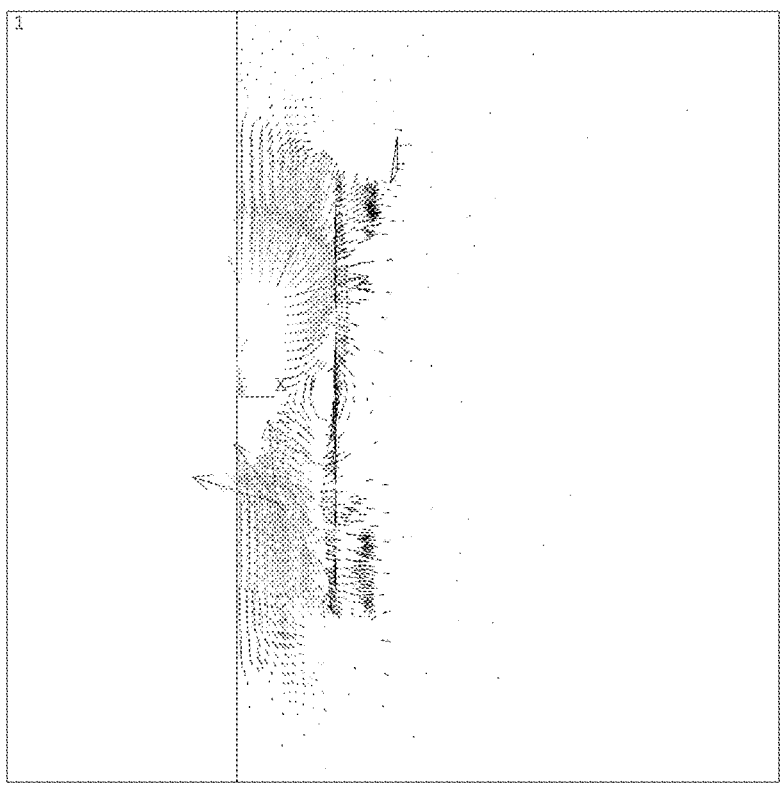
FIG. 10 shows the vector of the magnetic field strength H [A/m] from simulation for the example LVDT.
Figure 11:
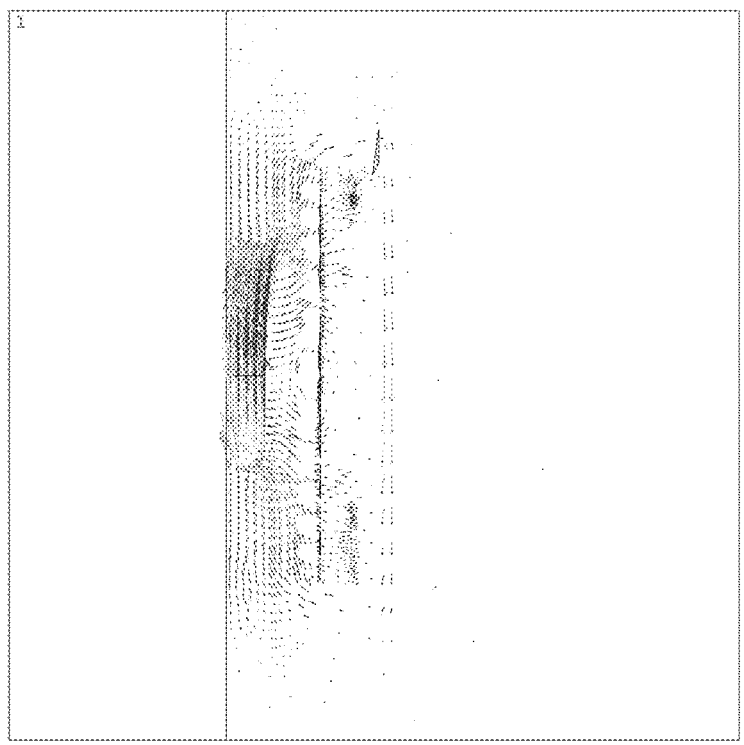
FIG. 11 shows the vector of the electromagnetic flux density BSUM [T] from simulation for the example LVDT.
Figure 14:
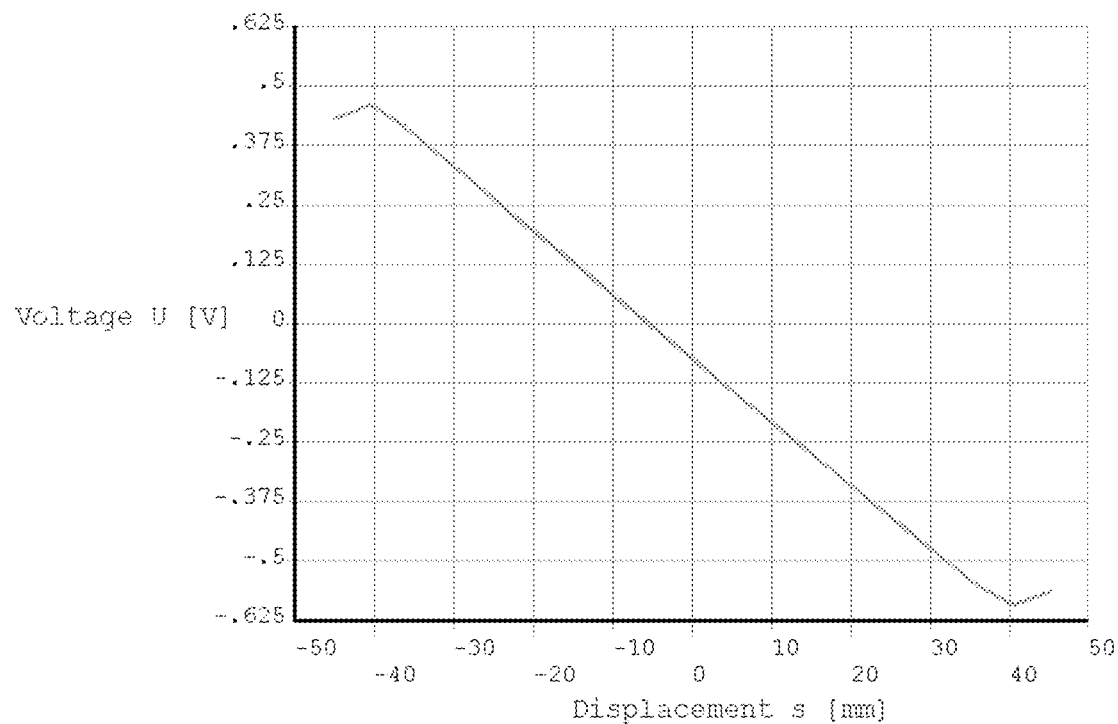
FIG. 14 shows the sensor characteristic U(s) of the inductive displacement sensor of FIG. 10 at a signal generator/length ratio of 0.1:1.

In FIG. 14, the sensor characteristic U(s) of the inductive displacement sensor of FIG. 10 at a signal generator/length ratio of 0.1:1 is shown. The signal generator was consciously removed from the coil area on the left and right (bends in the path characteristic) in order to show that the path information is based exclusively on the way the secondary coils are designed. It can be seen that the basic course of the sensor characteristic is maintained, and the size of the signal transmitter only affects the amplitude of the output signal.

Figure 15:
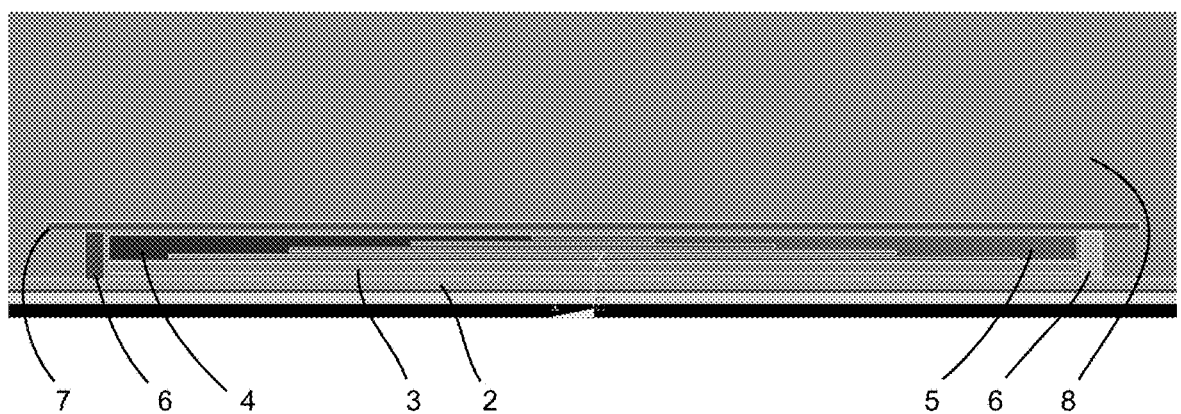
FIG. 15 shows the finite elements representation of an LVDT with interlaced secondary coils in half-symmetry, e.g. to avoid zero-point errors.

FIG. 15 shows the finite elements representation of an LVDT with interlaced secondary coils in half-symmetry, e.g. to avoid zero-point errors. Cross-sectional representation according to FKZ KU0568901RR7 with coding of the material allocation: Stainless steel pressure tube (2), primary coil (inside) (3), secondary coil 1 (left) (4), secondary coil 2 (right) (5), left and right end disc (6), housing (7), air environment (8).

The invention describes a fundamental simplification for all inductive conductor arrangements by standardizing the geometry of such conductors by one or more short-circuited ladder-rungs arrangements which influence each other, under certain circumstances, each with several short-circuited turns in space, wherein the sum of the short-circuit currents becomes a clear indicator of the spatial distance and positioning of a magnetizable object, for example. With the aid of lithography techniques and thin films, such ladder-rungs arrangements are very easy to produce by means of printing processes and can either be arranged in space, or assume any rolled-up or spiral shape in space that a wound or spirally wound film allows. One, several or any number of such ladder-rungs foils can be arranged arbitrarily in space and optionally serve as sensor(s) or transmitters. The distances between the short-circuited rungs in space can be equidistant or the distances vary, for example with a constant factor X increasing. The distance, the length and the cross section of the short-circuit strands in relation to each other are also variable, the ladder spars can be arbitrary in space and be designed trapezoidal, for example, or follow any curves in the plane or in space, and the short-circuit strands can be designed with changing cross section. These variations can also occur in a mixed fashion, for example in the form of an arbitrary three-dimensional barcode.

By way of example, the ladder-rungs arrangement describes as a new claim the arrangement of crossing-free planar and spatial coils by canonical transformation.

The aim of the new approach is to design the electromagnetic flux density in space in such a way that its distribution does not depend on the shape and size of the signal transmitter, nor on the housing or its boundaries. For this purpose, according to the Nyquist sampling theorem, conductor patterns are arranged as reference points in the space in such a way that arbitrary path coordinates can be detected including local refinement by means of barcodes or vernier coils. This approach can be both inductive and capacitive and is directly suitable for all axial two-quadrant displacement sensors, all four-quadrant path sensors, planar and cylindrical angle encoders, proximity sensors and proximity switches, linear combinations of the aforementioned subsystems and new applications of far-field electromagnetic field measurement at moderate signal frequencies.

An essential prerequisite for dimensionally stable execution of electromagnetic coils in a space are high- and highest-resolution batch processes for the production of conductor patterns. Preference is given to these production methods, which have been established for more than four decades in the field of "Printed Circuits" (see Methods of Thin Film or Thick Film Technology, amongst other things, from the Globaltronics 2010, Sep. 13-15, 2010, Singapore). These include classic multi-layer flexible circuits, paste-based offset printing on carrier films with optional release of carrier film during assembly, industrial inkjet techniques, dispensor tapes with pre-assembled conductor patterns for placement machines, and many others. Another goal is to simplify the construction of windings for electromagnetic machines with extreme drive power. For this, windings in punching or rolling technology or by injection molding are considered.

The printed circuit manufacturing processes provide multi-layer flexible conductor patterns with a limited number of vias between individual layers. However, plated-through holes are comparatively expensive and very space-consuming for larger current densities. As a result of this situation, conventional sequential windings in printing technology are not realistic for large power requirements.

In electrical engineering, current and voltage sources are considered dual as the basic equivalent circuits for feeding passive and active circuits. The task is to convert voltage-guided coils into equivalent current-carrying coils in the course of a canonical transformation. The general expectation is that, when transitioning from the voltage range to the current range, the primary voltages decrease with the number of winding turns, and the branch currents increase with the number of winding turns while the electric power remains the same. Furthermore, it is expected that a simpler wiring specification can be derived in the current range due to the parallel connection of branch currents, which possibly leads to simpler topologies in print technology in the sense of "printed circuits".

FIG. 16 shows the equation systems used for the transfer of voltage-guided coils into equivalent current-carrying coils. As can be seen from the comparison of voltage range and current range, a voltage-driven coil according to equation 12 can be converted into a current-controlled coil according to equation 13. The two equations 12 and 13 respectively apply to the application of a generator or sensor, in which the internal electromagnetic flux leads to the supply of an externally connected electrical circuit. As expected, the number of turns occurs as a common scaling factor between the two domains. And in fact the Helix structure of the voltage-driven coil now becomes a completely flat structure, which can be trivially derived from any planar or rotational printing process. Depending on the resistance level of the wire turns Rw in equation 13 operation is with low impedance bus bars. The evaluation of the sensor signal is typically carried out at the signal terminal voltage zero, i.e. virtual short circuit. This virtual short circuit can be done with low impedance wiring. A proven method is the connection of the two current-controlled coil terminals to the input of an operational amplifier, which is connected as a current/voltage converter.

Similarly, a voltage-driven coil according to equation 14a, b can be transformed into a current-controlled coil according to equation 15a, b. Equations 14 and 15 respectively apply to the case of application of a motor or a field source in the case of the sensor arrangement in which the internal electromagnetic flux is generated by an electrical circuit connected externally. Here, too, the number of turns occurs as a common scaling factor between the two domains, and the helical structure of the voltage-driven coil can be converted once more into a completely planar structure.

The canonical transformation of voltage-guided coils into those with current guidance and vice versa is a basic mapping from the circuit theory, and can therefore be used for any application. With respect to the task of displacement measurement a flat printed circuit is first discussed, which may be constructed without restriction as a film circuit.

Figure 17:
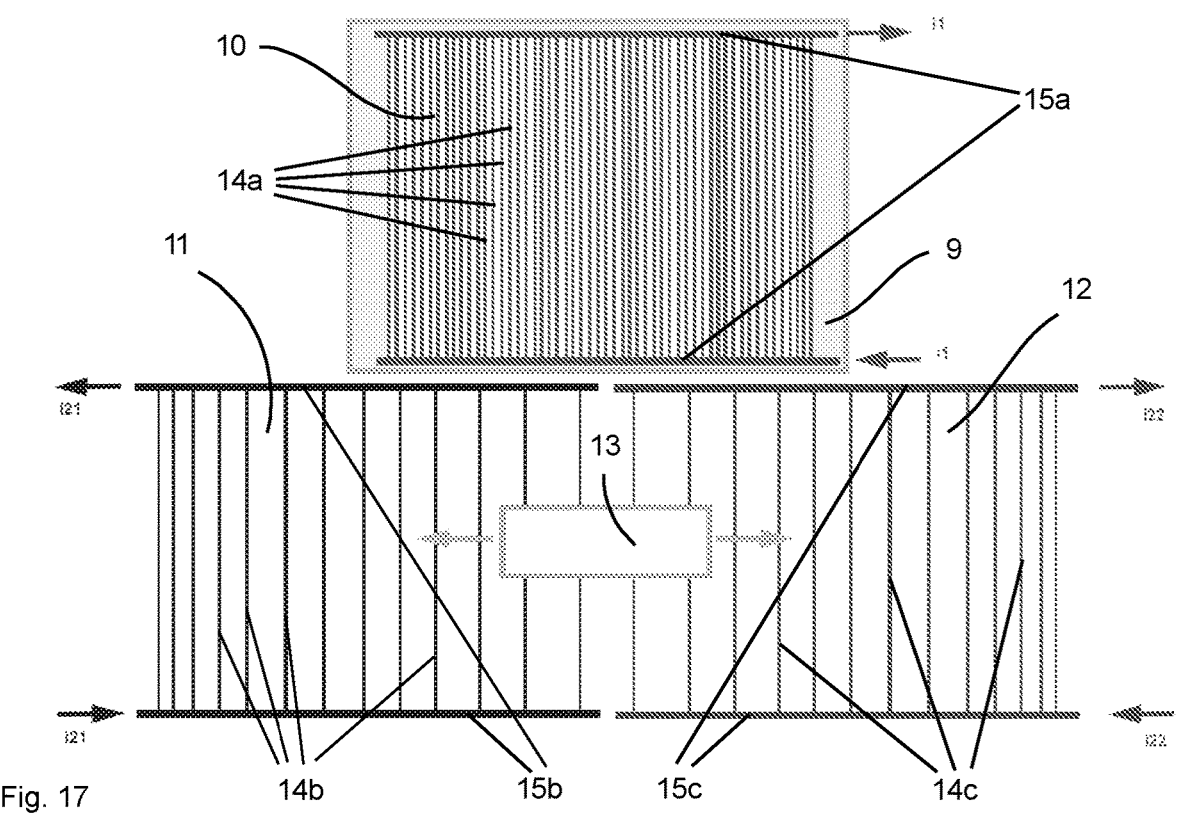
FIG. 17 shows the arrangement of inductive displacement sensors with planar coils and shows by way of example a planar inductive displacement sensor in layer construction with a total of four layers.

As one of the many possible embodiments of the invention, FIG. 17 shows the arrangement of inductive displacement sensors with planar coils and shows by way of example a planar inductive displacement sensor in layer construction with a total of four layers. The primary coil (10) in layer 1 consists of a ladder-rungs arrangement consisting of rungs (14a), spars (15a) and an alternating current i1 impressed on the spars. The primary coil operates as a field generator according to equation 15a, b with bottom field foil (9) based on mu-metal in layer 0. The first secondary coil (11) in layer 2 with ladder-rungs arrangement consisting of rungs (14b), spars (15b) and an alternating current i21 impressed on the spars and the second secondary coil (12) in layer 3 with ladder-rungs arrangement consisting of rungs (14c), spars (15c) and an alternating current i22 impressed on the spars work as displacement sensors, which are encoded with a path information in the form of a progressively increasing or decreasing conductor density. All four layers are stacked vertically and are insulated from each other. In the uppermost layer 4 runs a freely movable, soft magnetic position transmitter (13). The terminals of the two secondary coils are each connected to a separate current/voltage converter. From their outputs, the path signal is finally determined by subtraction. In the simplest case, it is sufficient to switch the two secondary coils in parallel. The current difference can then be formed with a purely passive circuit (ohmic resistance).

The configuration of the displacement sensor in FIG. 17 can be extended as follows:

a) Four-quadrant displacement sensor:
  Layer 0: mu-metal
  Layer 1: primary coil rotated by 45°
  Layer 2: secondary coil 1
  Layer 3: secondary coil 2
  Layer 4: copy of secondary coil 1 rotated by 90° (secondary coil 3)
  Layer 5: copy of secondary coil 2 rotated by 90° (secondary coil 4)
  Layer 6: position transmitter, which can be detected in the entire plane (four quadrants).

b) Four-quadrant displacement sensor as a flat angle encoder:
  Layer 0: mu-metal
  Layer 1: primary coil rotated by 45°
  Layer 2: secondary coil 1
  Layer 3: secondary coil 2
  Layer 4: copy of secondary coil 1 rotated by 90° (secondary coil 3)
  Layer 5: copy of secondary coil 2 rotated by 90° (secondary coil 4)
  Layer 6: position transmitter, which rotates over the entire plane.

c) Two-quadrant displacement sensor as a flat angle encoder:
  Layer 0: mu-metal designed as a flat circular band
  Layer 1: primary coil designed as a flat circular band
  Layer 2: secondary coil 1 designed as a flat circular band
  Layer 3: secondary coil 2 designed as a flat circular band
  Layer 4: position transmitter which rotates along the circular band structure.

d) Two-quadrant displacement sensor as a cylindrical angle encoder.
  Layer 0: mu-metal
  Layer 1: primary coil
  Layer 2: secondary coil 1
  Layer 3: secondary coil 2
  Layer 4: position transmitter, which rotates along the cylinder jacket.
  The entire assembly is rolled up around the vertical axis in a cylinder with 360°.

e) Four-quadrant displacement sensor as parabolic far field sensor:
  Layer 0: mu-metal
  Layer 1: primary coil rotated by 45°
  Layer 2: secondary coil 1
  Layer 3: secondary coil 2
  Layer 4: copy of secondary coil 1 rotated by 90° (secondary coil 3)
  Layer 5: copy of secondary coil 2 rotated by 90° (secondary coil 4)
  Layer 6: metallic position transmitter, at some distance e.g. >1 m.
  The entire assembly is cured, for example, in a parabolic bowl with adhesives.
  To obtain an electromagnetic directional characteristic. This can be used at low frequencies already.

In FIG. 18-21 it is shown that planar sensors can be built in virtual reality quite the same way as the ladder-rungs arrangement described in FIG. 17.

Figure 18:
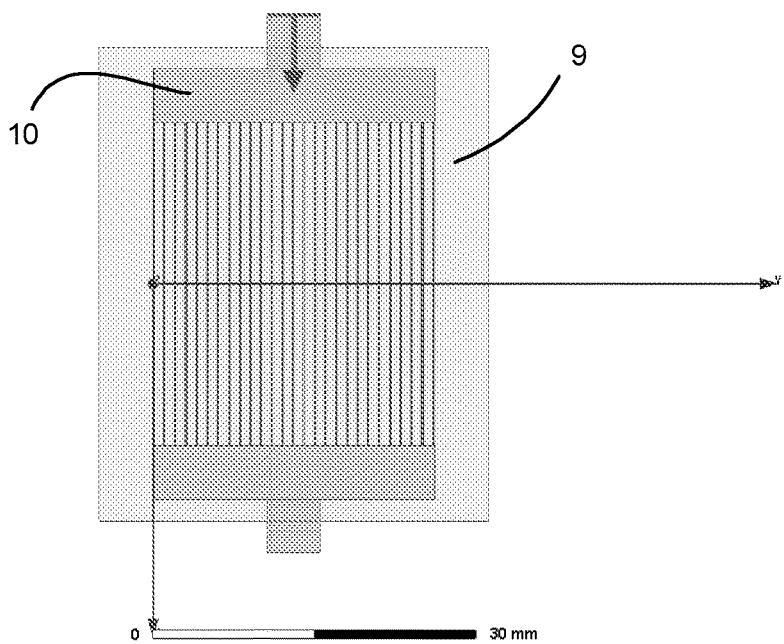
FIG. 18 shows to a flat displacement sensor in ladder-rungs arrangement, layer 0: shielding (9), layer 1: the primary grid (10) as a feed-in system.

FIG. 18 shows to a flat displacement sensor in ladder-rungs arrangement, layer 0: shielding (9), layer 1: the primary grid (10) as a feed-in system.

Figure 19:
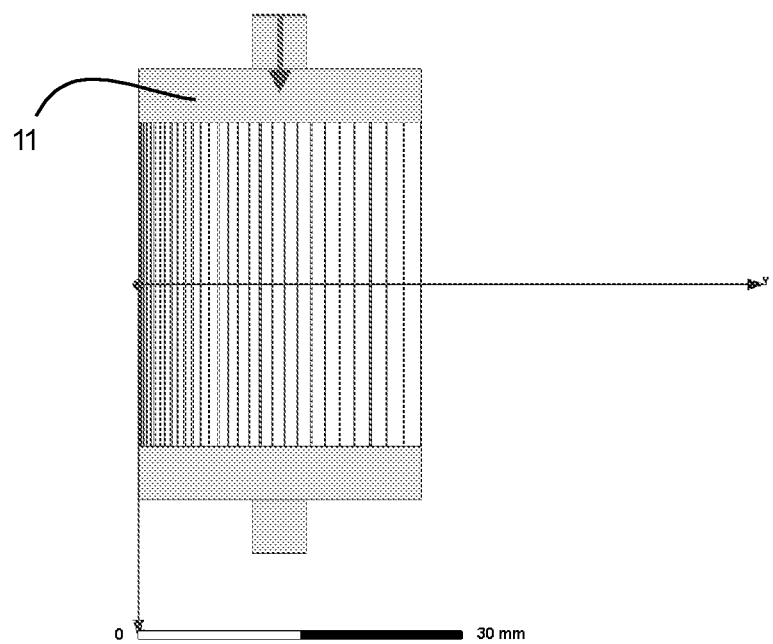
FIG. 19 describes a flat displacement sensor in ladder-rungs arrangement with layer 2: first secondary grid (11).

FIG. 19 describes a flat displacement sensor in ladder-rungs arrangement with layer 2: first secondary grid (11).

Figure 20:
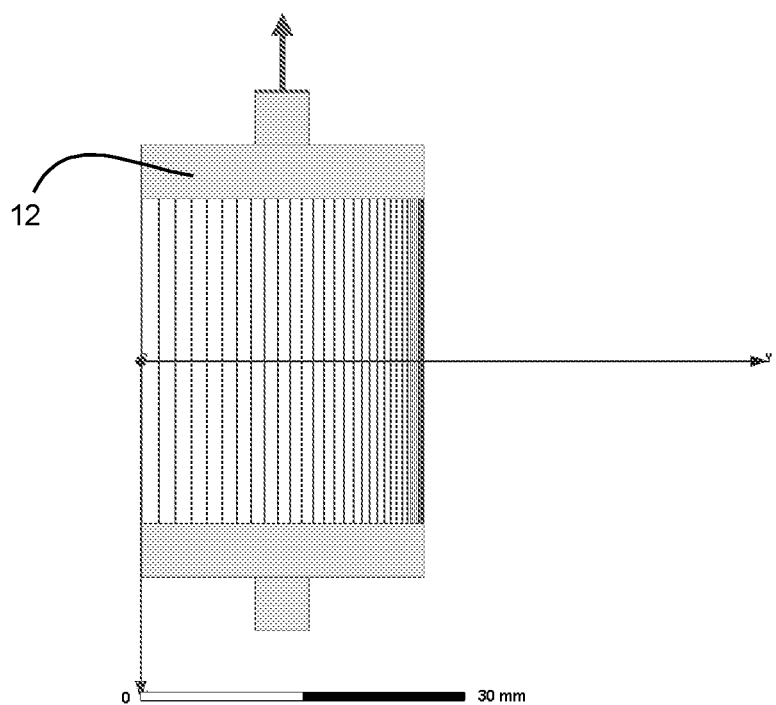
FIG. 20 describes a flat displacement sensor in ladder-rungs arrangement, layer 3: second secondary grid (12).

FIG. 20 describes a flat displacement sensor in ladder-rungs arrangement, layer 3: second secondary grid (12).

Figure 21:
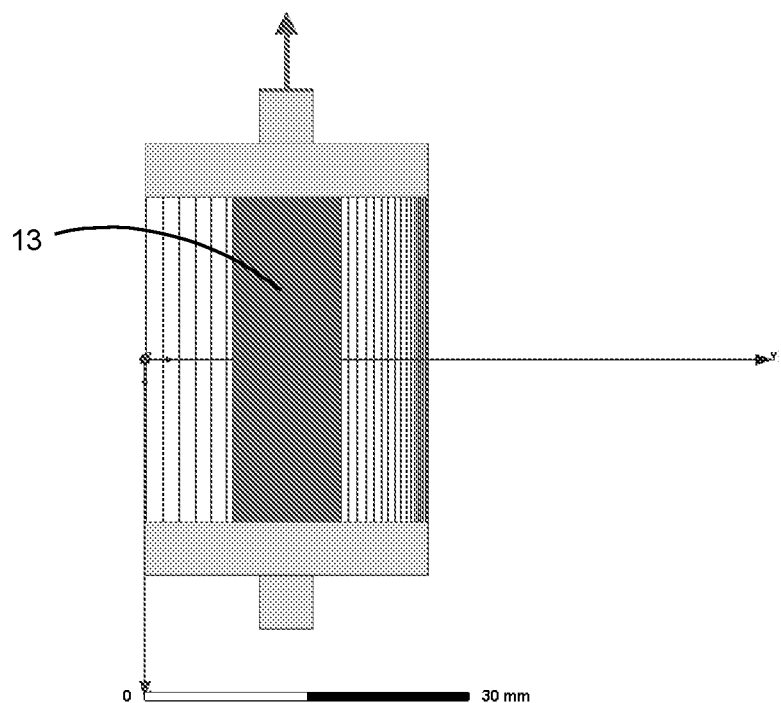
FIG. 21 describes a flat displacement sensor in ladder-rungs arrangement having layer 4: transmitter (13) shown over layer 3: second secondary grid.

FIG. 21 describes a flat displacement sensor in ladder-rungs arrangement having layer 4: transmitter (13) shown over layer 3: second secondary grid. The extension of the transmitter transversely to the movement in the direction of the y-axis is not decisive for the task of measuring distance, as long as its cross section Aa, i.e. its projected area on the layers 1 to 3, remains constant during the movement.

All arrangement shown in FIG. 17 to FIG. 21, FIG. 23, FIG. 25 and FIG. 27 as well as FIG. 30 to 37 were calculated with the help of computer-aided simulation workflows, and verified according to the desired or planned action and functionality, and thus validated virtually in terms of their functionality.

The same applies to any geometric alternate embodiment of the multilayer printed circuit ladder-rungs configurations.

Figure 22:
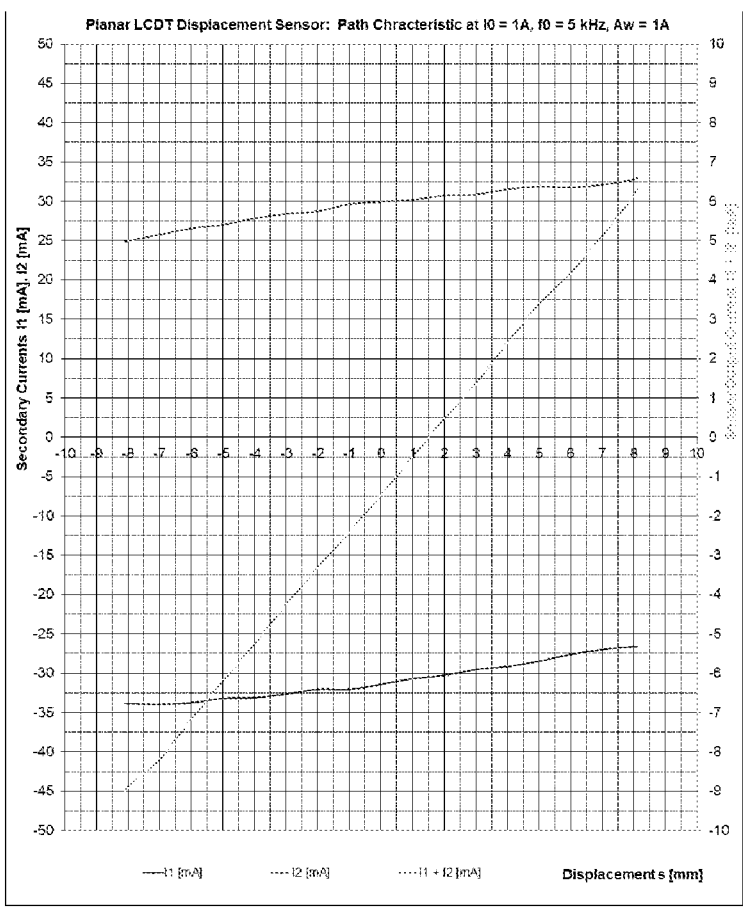
FIG. 22 shows the calculated path characteristic of a planar inductive displacement sensor in 2D printing technique in ladder-rungs arrangement according to FIG. 18 to FIG. 21.

FIG. 22 shows the calculated path characteristic of a planar inductive displacement sensor in 2D printing technique in ladder-rungs arrangement according to FIG. 18 to FIG. 21: sensor characteristic I(s). Dual, planar crossing-free form to LVDT displacement sensor in FIG. 12 with wire grids with significantly better linearity. I1 is the signal current in the secondary grid 1, I2 is the signal current in the secondary grid 2, (I1+I2) is the total current of the two secondary grids with the expected linear path characteristic. Unlike in FIG. 15 no corrective measures have been applied to the two secondary grids yet. Compared to the LVDT in FIG. 15, this current-driven displacement sensor operates at a fraction of the electrical operating power. The calculated number of ampere-turns of the primary grid is only Aw=1 A.

Figure 23:
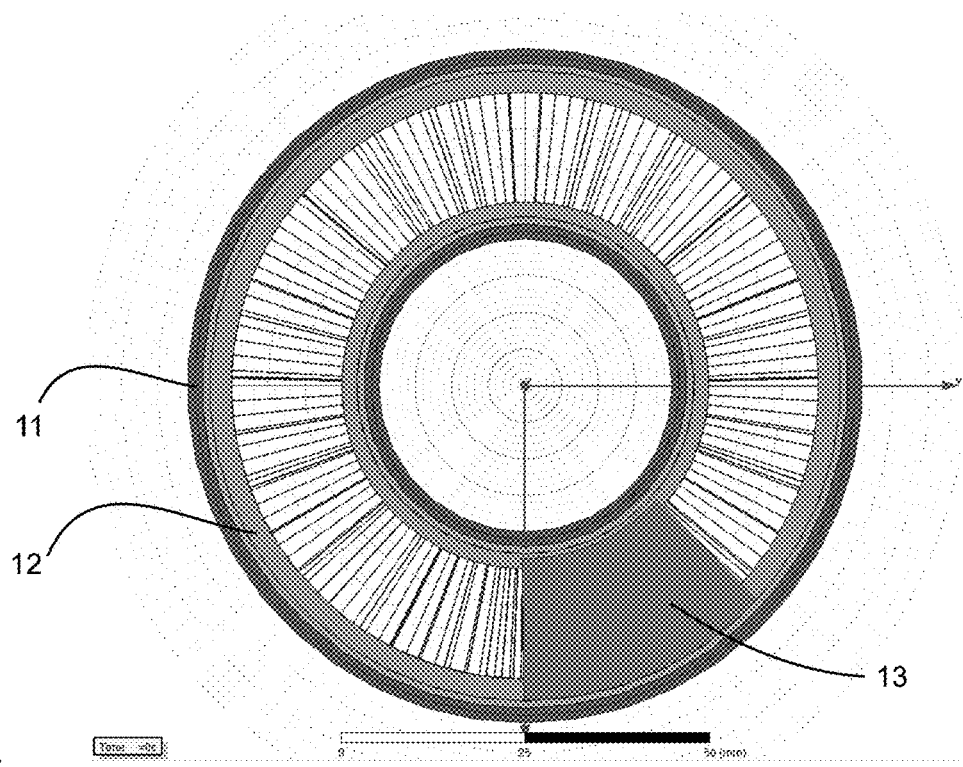
FIG. 23 illustrates how the flat displacement sensor in ladder-rungs arrangement in accordance with FIG. 18 to FIG. 21 is converted into a planar angle sensor by polar coordinate transformation.
Figure 24:
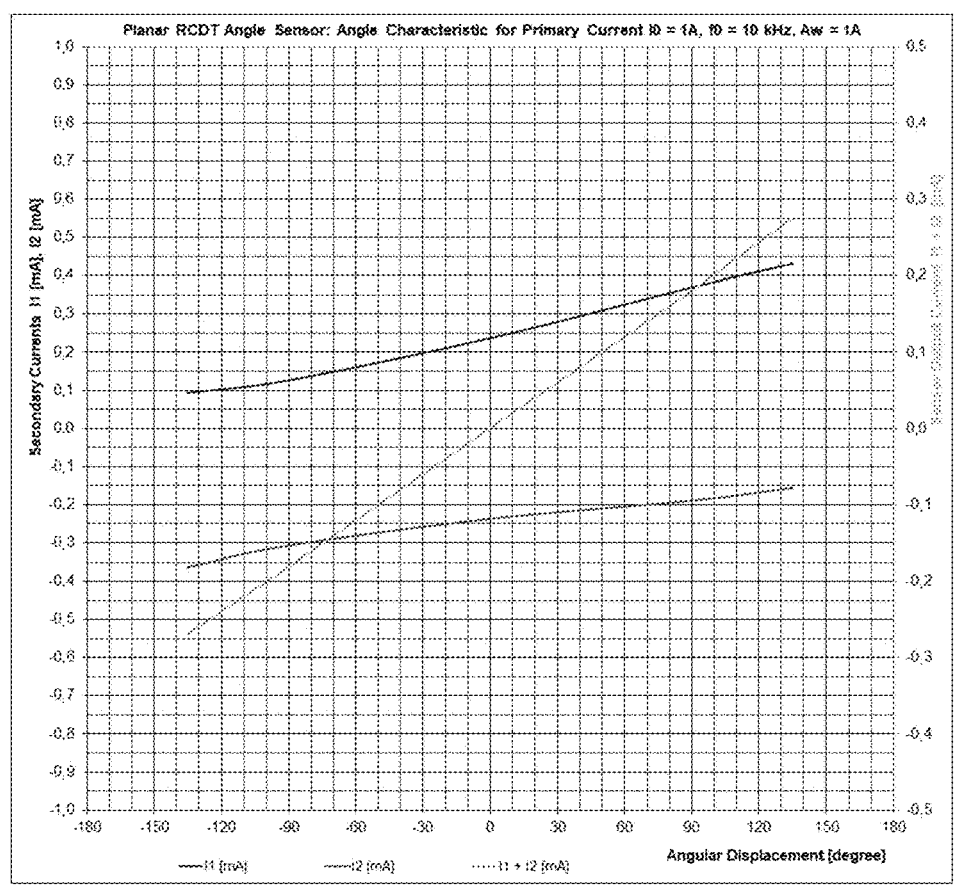
FIG. 24 shows by way of example an angle characteristic calculated analogously thereto.

FIG. 23 illustrates how the flat displacement sensor in ladder-rungs arrangement in accordance with FIG. 18 to FIG. 21 is converted into a planar angle sensor by polar coordinate transformation, which covers all four quadrants and can continue to be used as a resolver for continuous rotational movements. FIG. 23 shows the view of the two secondary grids and the angle transmitter, which rotates around the center of the polar coordinate system. The primary grid and the shielding foil according to FIG. 18 are behind it. Rotationally symmetric structures allow an ideal formulation of the boundary conditions for electromagnetic fields. For example, here the electrodes for feeding the currents into the primary and secondary grids can be kept very slim. This makes it possible, for example, to design small structures for an extended frequency range. FIG. 24 shows by way of example an angle characteristic calculated analogously thereto.

Figure 29:
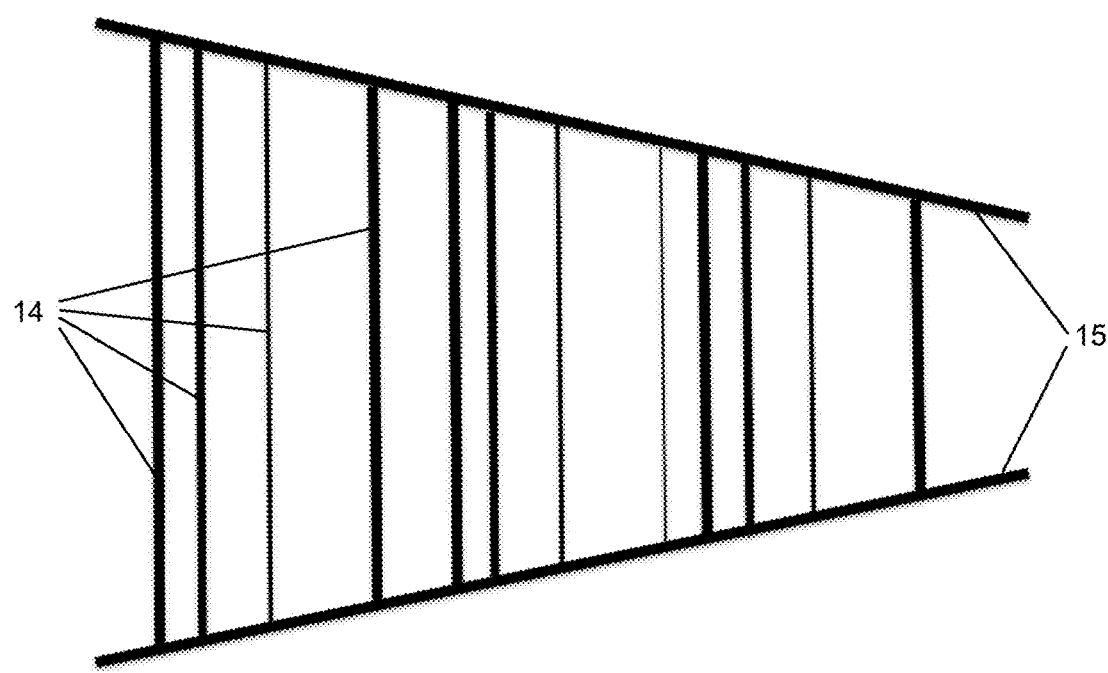
FIG. 29 shows a schematic representation of a trapezoidal bar code label with associated rungs (14) and spars (15).

Ladder-rungs structures can be extended almost arbitrarily and thus become very large depending on the size of the covered area. For practical reasons, it is advisable in such cases to arrange transmitter and receiver systems, either periodically sequenced, hierarchically and/or in a matrix form. The necessary identification or differentiation of multiple ladder-rungs based transmitters and receivers can be done, for example, with barcode labels, which have different codes on the variance of distance and cross section of the rungs, possibly in conjunction with e.g. trapezoidal or otherwise curved arranged spars. FIG. 29 shows a schematic representation of a trapezoidal bar code label with associated rungs (14) and spars (15).

Another possible embodiment is described below in the form of inductive displacement sensors with non-crossing cylindrical coil.

From equation 13 it can be seen that current-controlled coils are also possible in the form of a series/parallel circuit. To do this, in equation 13, each individual turn is passed through several times before the shorting bars are contacted. The purpose of this arrangement for sensors is to achieve a higher electromagnetic flux. In addition, by these measures, the individual turns accumulate higher impedance, so as a rule an operational amplifier for evaluating the sensor signal can be dispensed with. This also makes it possible to use power circuits with no intersection technology. That is, this method is applicable to field sources and all induction generators, and more generally suitable for the construction of electromagnetic machines at low impedances.

Figure 3:
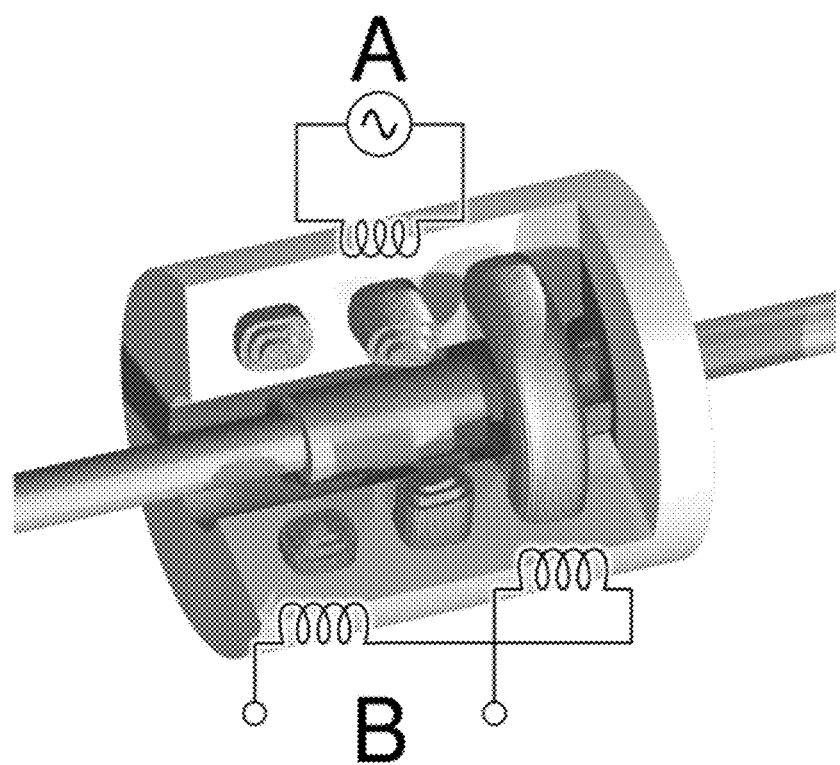
FIG. 3 shows an LVDT (Linear Variable Differential Transformer) as an analog sensor for displacement measurement.
Figure 4:
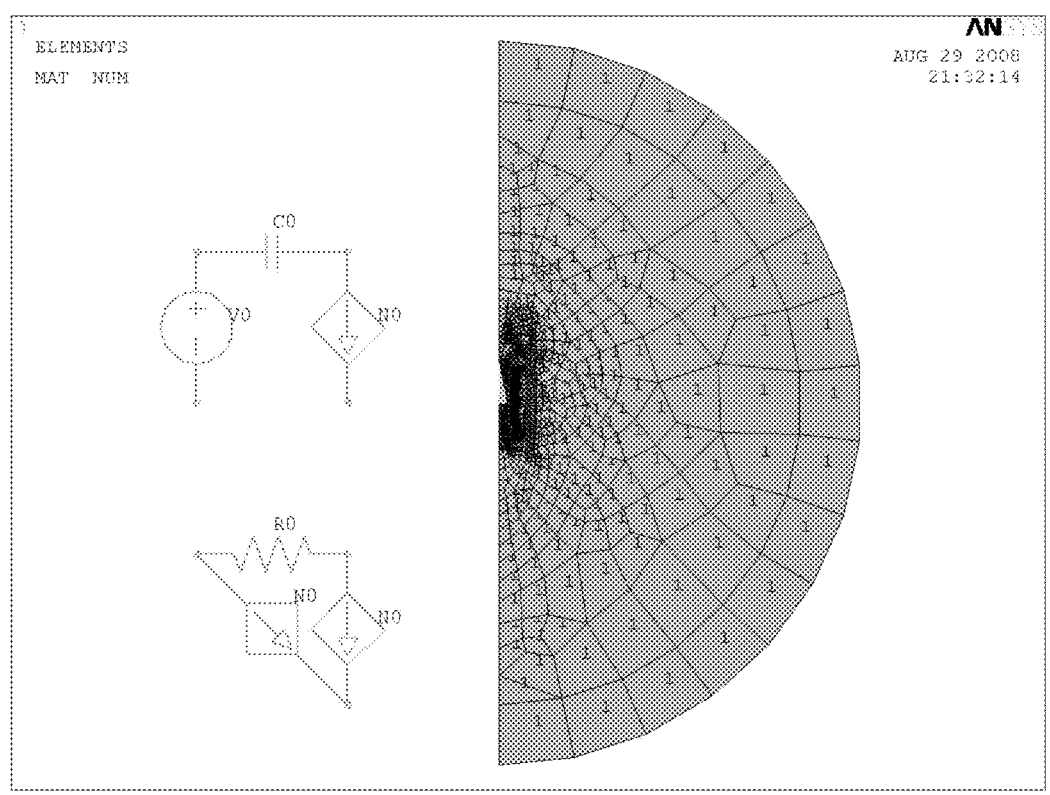
FIG. 4 shows a half-symmetry display of an LVDT field domain including the complete external circuitry after the automatic discretization has been performed.
Figure 5:
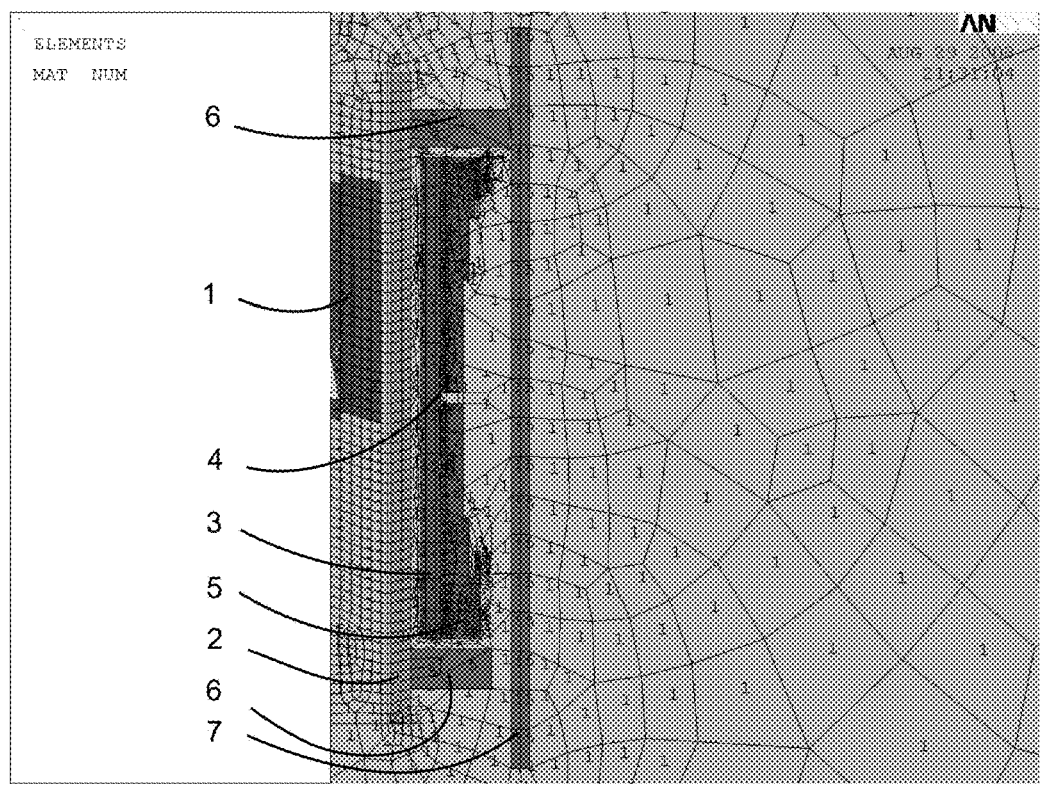
FIG. 5 shows a finite element-illustration of an exemplary LVDT in half-symmetry.
Figure 6:
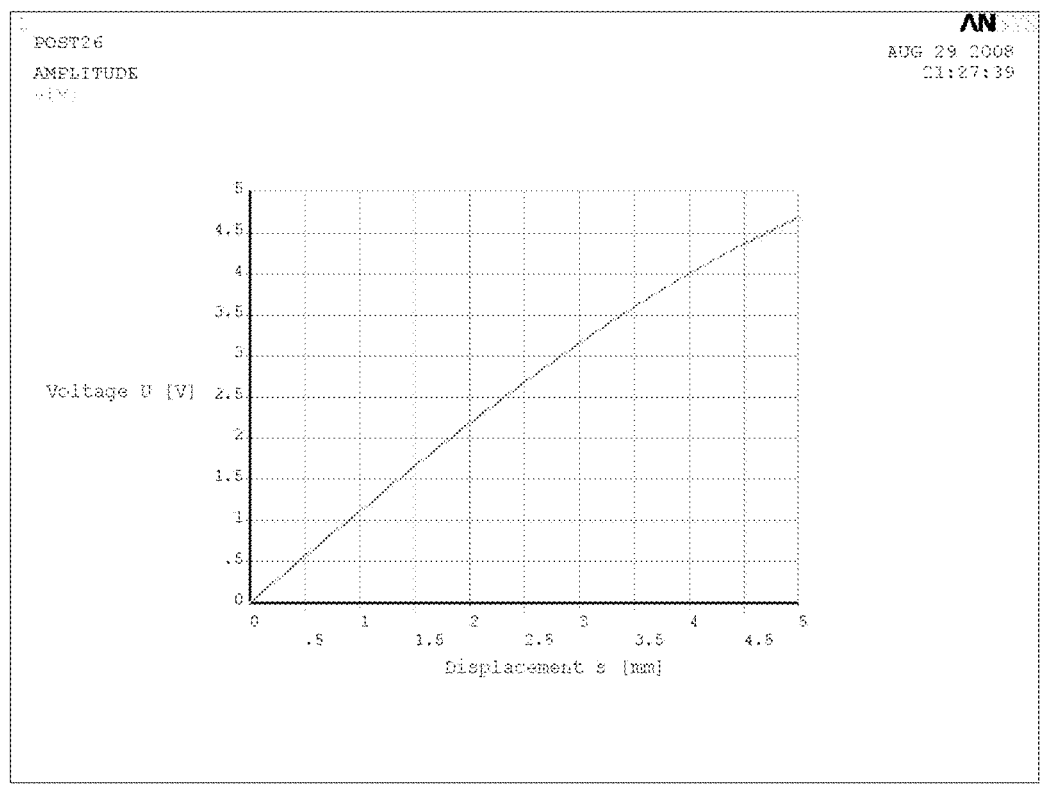
FIG. 6 shows the amplitude of the complex sensor output voltage U as a function of the path coordinates.
Figure 7:
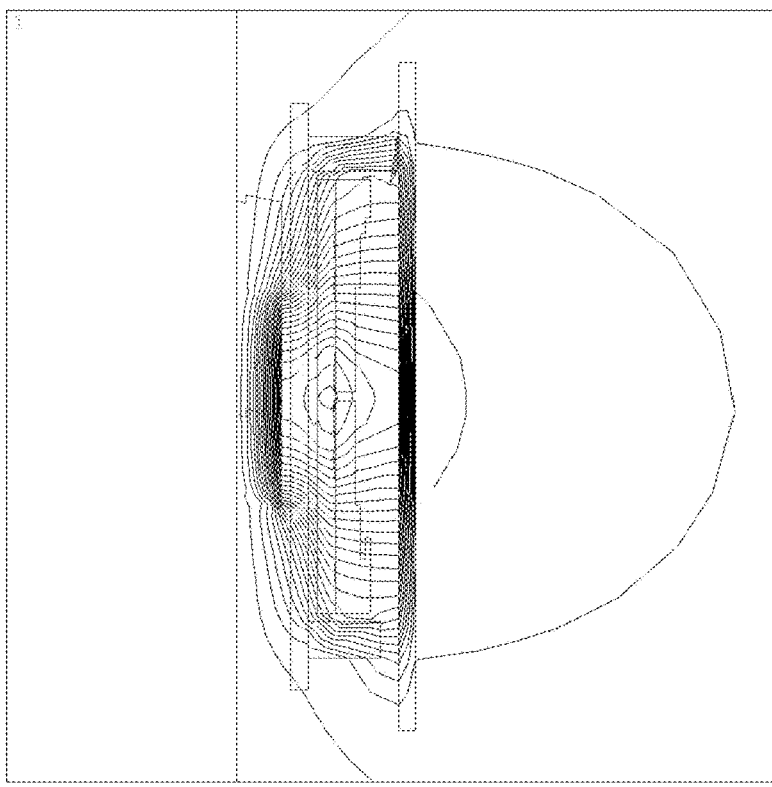
FIG. 7 shows the representation of the magnetic field lines for the example LVDT.
Figure 8:
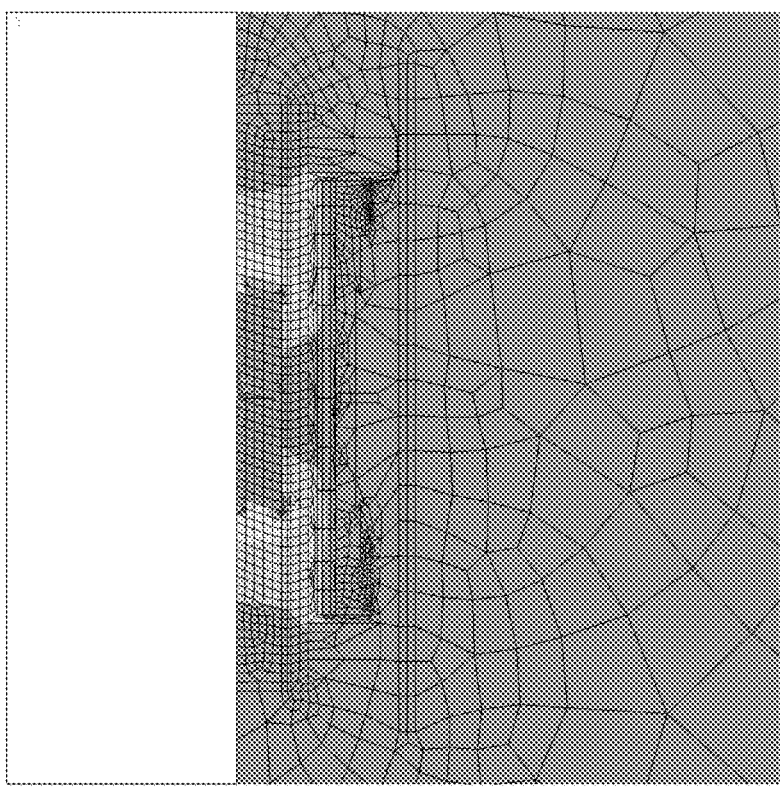
FIG. 8 shows the magnitude of the magnetic field strength HSUM [A/m] from simulation of the example LVDT.
Figure 9:
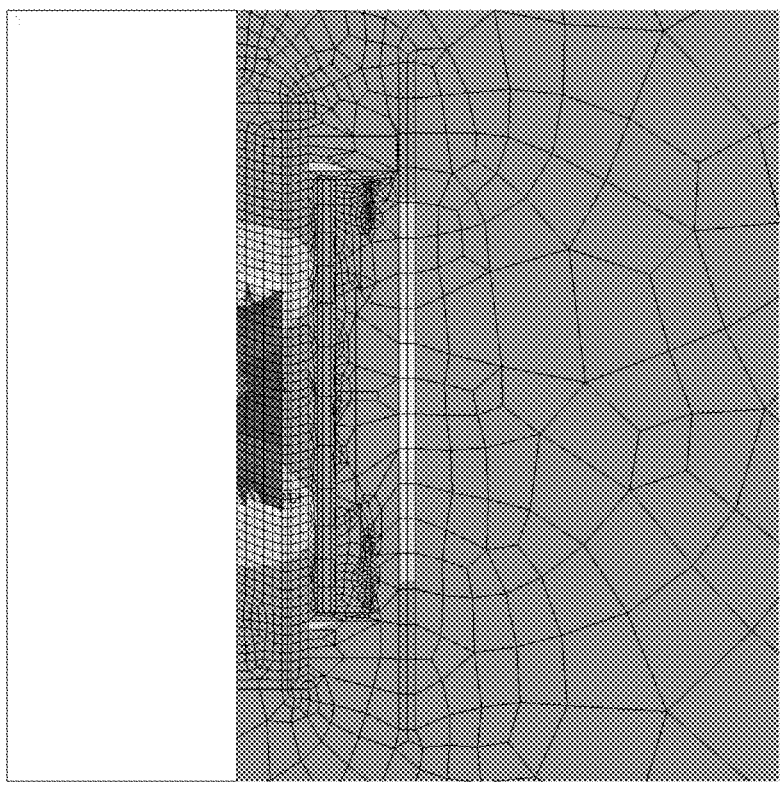
FIG. 9 shows the magnitude of the electromagnetic flux density BSUM [T] from simulation for the example LVDT.
Figure 25:
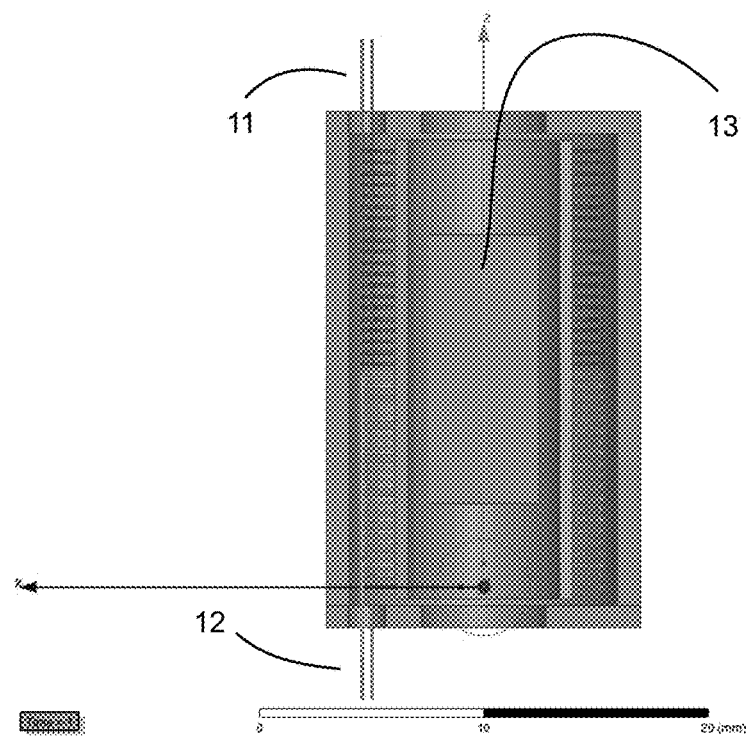
FIG. 25 shows a cylindrical inductive displacement sensor in 2D/3D-rolling technique with three turns per winding loop.

FIG. 25 shows a cylindrical inductive displacement sensor in 2D/3D-rolling technique with three turns per winding loop, each for the upper secondary coil (11) or for the lower secondary coil (12), signal transmitter (13), not shown primary coil. The axial section shows a dual crossing-free form to LVDT displacement sensor from FIG. 5 with half coils exhibiting a significantly improved linearity.

Figure 26:
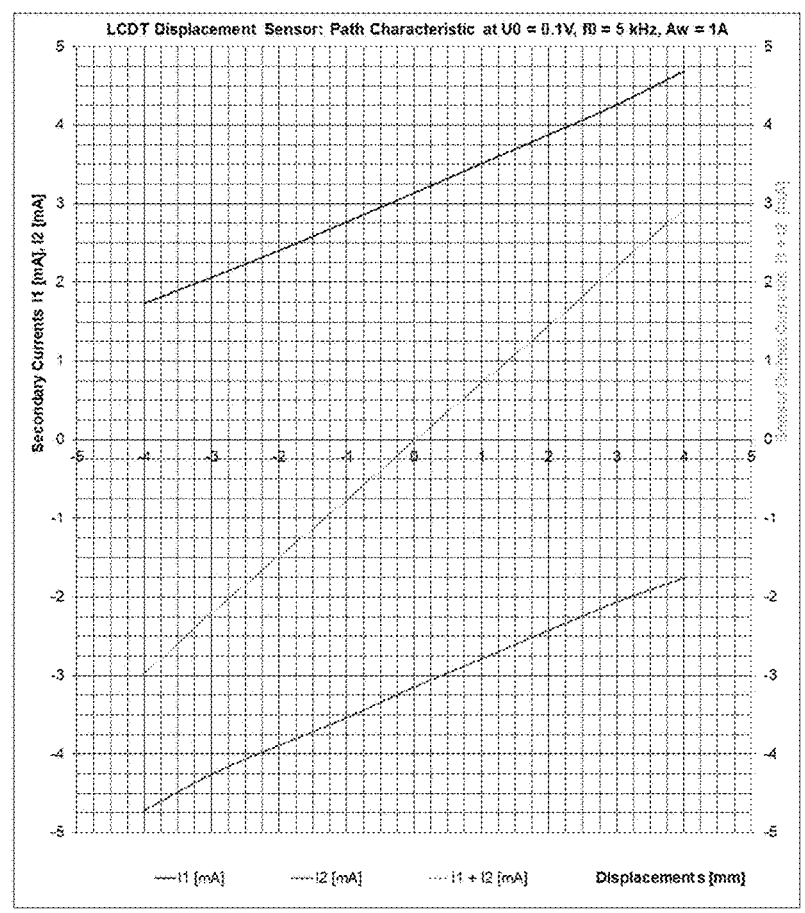
FIG. 26 shows the improved linearity of a cylindrical inductive displacement sensor in 2D/3D-rolling technique with three turns per winding loop.

The improved linearity of a cylindrical inductive displacement sensor in 2D/3D-rolling technique with three turns per winding loop is shown in FIG. 26. The sensor characteristic I(s) occurs in the following manner: I1 is the signal current in the secondary coil 1, I2 is the complementary signal current in the secondary coil 2, (I1+I2) is the total current of the two secondary coils with the expected linear path characteristic. Unlike FIG. 5, no corrective measures were applied to the two secondary coils. Compared to the LVDT in FIG. 5, this current-carrying displacement sensor operates at a fraction of the electrical operating power. The calculated number of ampere-turns of the primary winding being Aw=1 A only.

Figure 27:
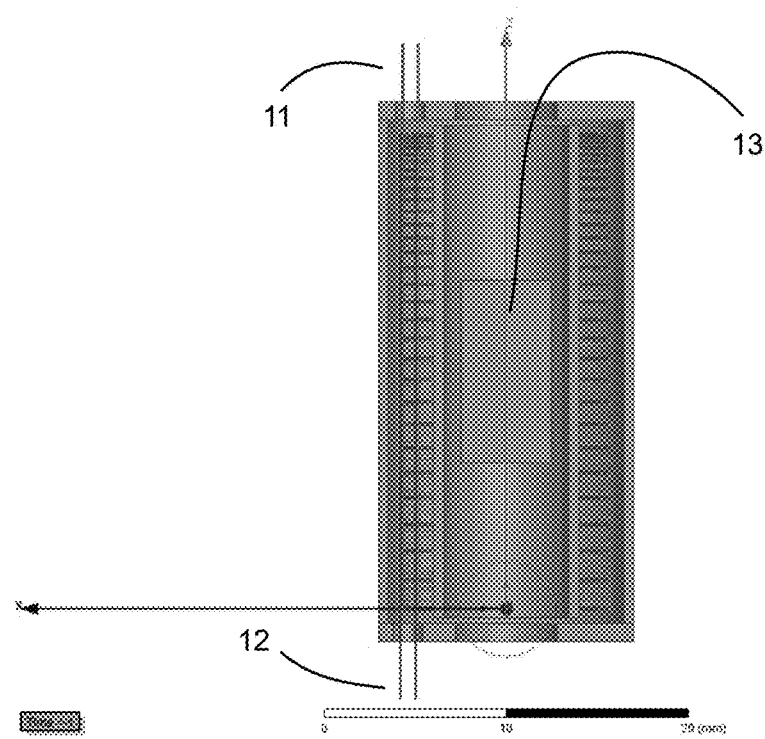
FIG. 27 shows a cylindrical inductive displacement sensor in 2D/3D-rolling technique with three turns per winding loop.
Figure 28:
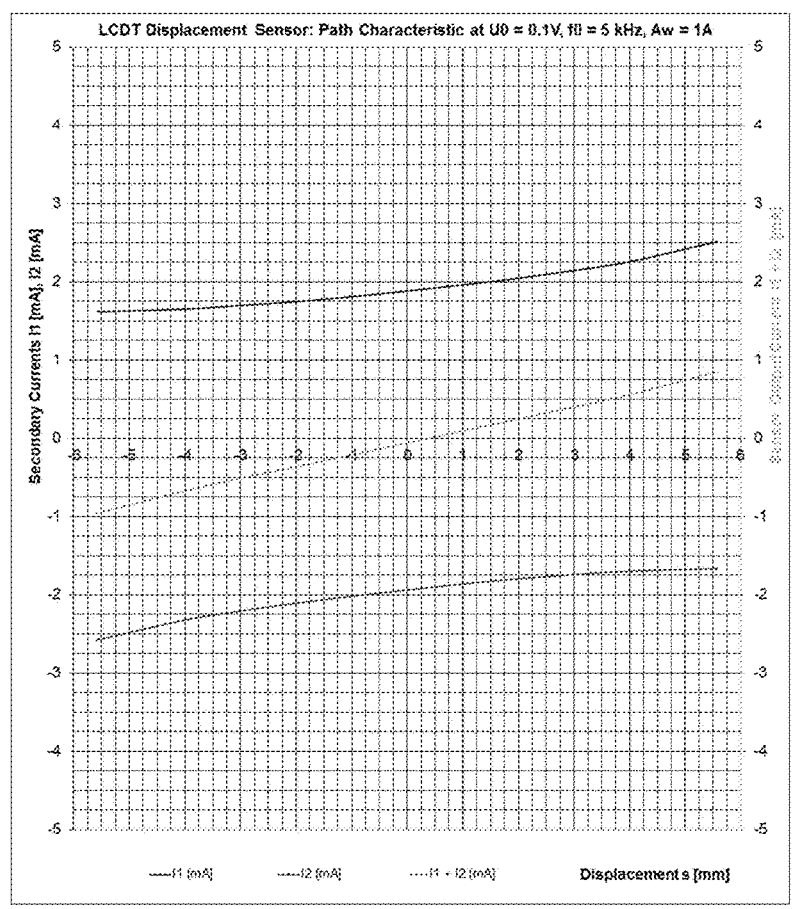
FIG. 28 shows fully interlaced secondary coils at significantly improved linearity.

FIG. 27 shows a cylindrical inductive displacement sensor in 2D/3D-rolling technique with three turns per winding loop, each for the upper secondary coil (11) or for the lower secondary coil (12), signal transmitter (13), primary coil not shown. The axial cut shows a dual intersection-free shape comparable to LVDT displacement sensor from FIG. 15 with fully interlaced secondary coils at significantly improved linearity, which is shown in FIG. 28. The sensor characteristic I(s) is calculated as follows: I1 is the signal current in the secondary coil 1, I2 is the opposite signal current in the secondary coil 2, (I1+I2) is the summation current of the two secondary coils with the expected linear path characteristic. Unlike FIG. 15, no corrective measures were applied to the two secondary coils. Compared to the LVDT in FIG. 15, this current-driven displacement sensor can handle a fraction of the electrical operating power. The calculated number of ampere-turns of the primary winding is only at Aw=1 A.

A further possible form of application for crossing-free planar and spatial coils will be described below for use in induction machines.

As stated above, current-controlled coils are also possible in the form of a serial/parallel connection. To do this, in equation 13, each individual turn is passed through several times before the shorting bars are contacted. The number of cycles is limited only by the available winding space. The purpose of this arrangement for induction machines is to achieve higher electromagnetic fluxes while keeping impedances low. In addition, by these measures, the individual turns achieve higher impedances, so that power amplifiers for impressing the strand currents can be dispensed with in most cases. Also, the requirements for the bus bar distribution become significantly lower. Thus, in particular power circuits in crossing-free technology are possible, which can be installed very easily and also be serviced later. That is, this method is applicable to field sources of all kinds and all induction generators, and more generally suitable for the construction of high-speed electromagnetic machines and energy converters even with high power.

Figure 30:
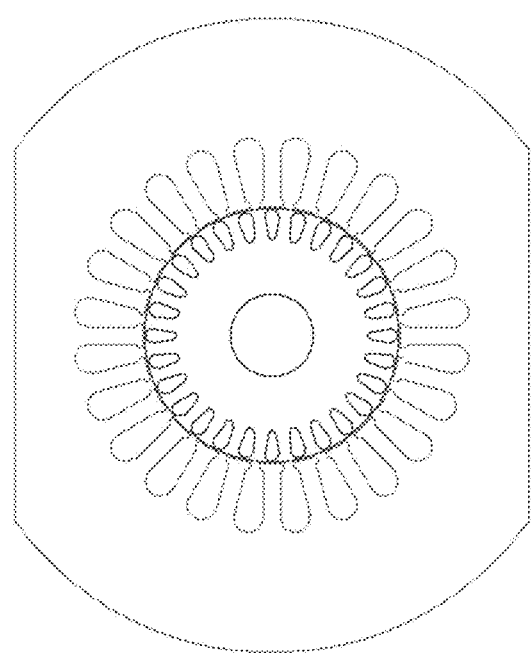
FIG. 30 shows the associated planar sheet metal section for an inner rotor with 28 slots.
Figures 31, 32:
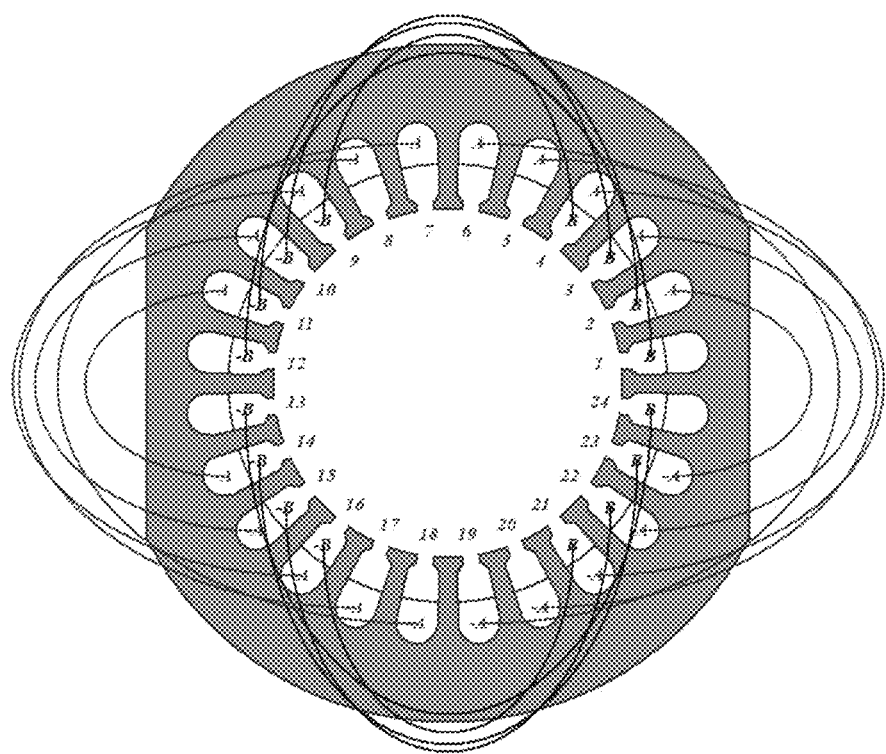
FIG. 31 shows the strand axes perpendicular to each other.
FIG. 32 shows the design of the windings in the main and auxiliary line done by means of sinusoidal turns.

In the FIGS. 30 through 37, a two-strand induction motor is described as an example. FIG. 30 shows the associated planar sheet metal section for an inner rotor with 28 slots. The stator has 24 slots. In this very common engine, the angular offset is expressed as an electrical angle alpha=90°. The strand axes are therefore perpendicular to each other, as shown in FIG. 31. The one strand, the so-called main strand is connected directly to the power network, the second strand, the so-called auxiliary strand, usually connects via a capacitor according to FIG. 34. The design of the windings in the main and auxiliary line is often done by means of sinusoidal turns, e.g. the turns in FIG. 32, differently designed for the main line (phase A) and the auxiliary line (phase B).

Figure 33:
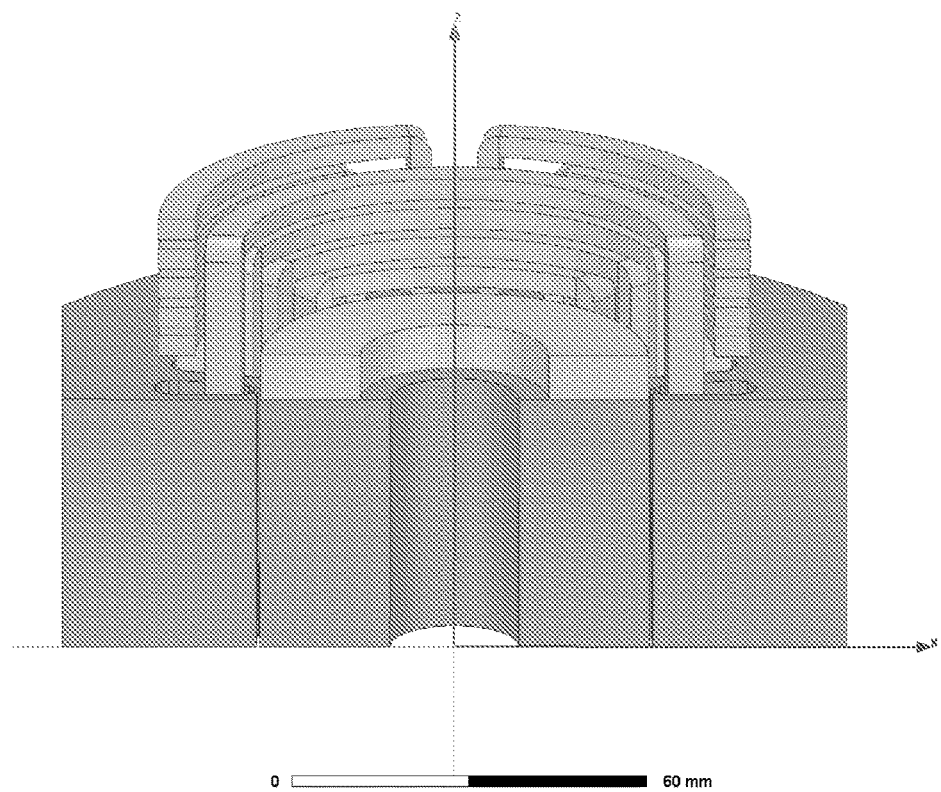
FIG. 33 shows a quarter section of the two-strand induction motor along the axis of rotation.
Figure 34:
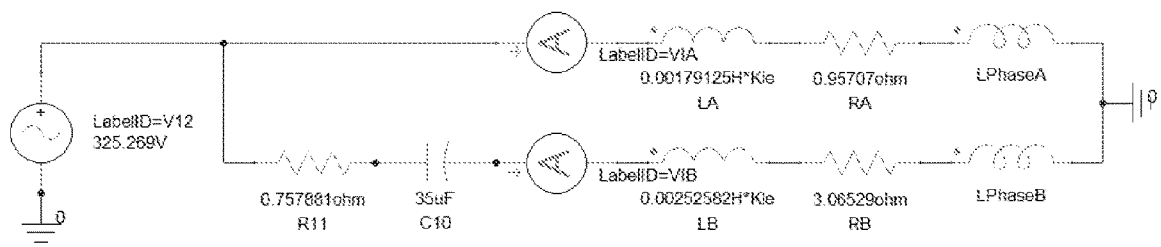
FIG. 34 shows that the one strand, the so-called main strand is connected directly to the power network, the second strand, the so-called auxiliary strand, via a capacitor.

FIG. 33 shows a quarter section of the two-strand induction motor along the axis of rotation. Here, the winding heads of the main windings A (outside) and the auxiliary windings B (inside) are to be seen and also the short circuit ring of the cage winding in the internal rotor.

Figure 35:
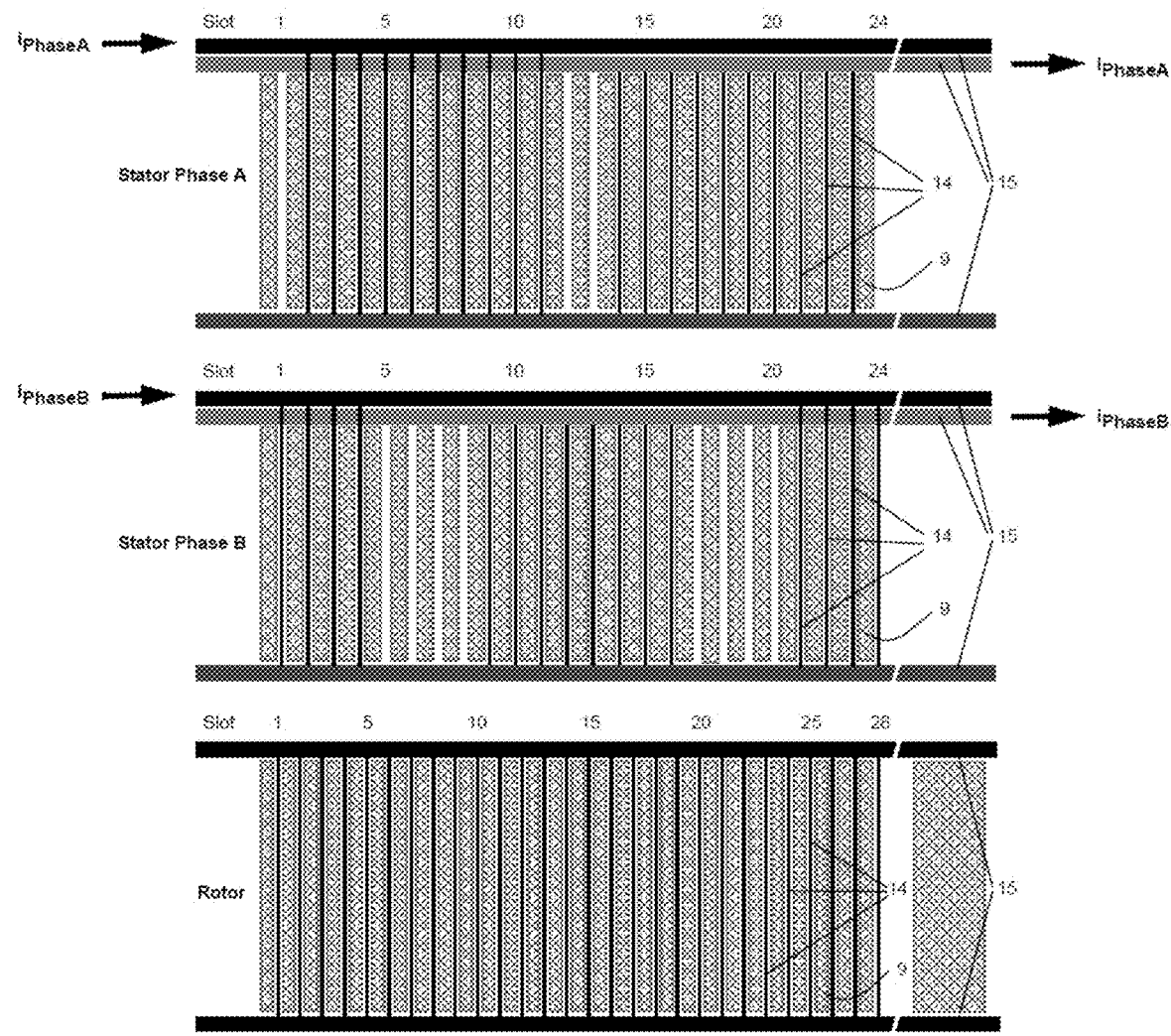
FIG. 35 shows a total of three ladder-rungs assemblies which are to replace the traditional windings of this two-strand asynchronous motor.

The FIG. 35 shows a total of three ladder-rungs assemblies which are to replace the traditional windings of this two-strand asynchronous motor. The two ladder-rungs arrangements, which are each duplicated, show the development of exactly one stator circulation for the main line (phase A, top) and the auxiliary line (phase B, center). The phase current of the phase A flows through the spar at the top left, passes through the stator in a positive direction downwards (slots A2-A11) and continues to traverse—after accumulation in the lower spar—the stator in a negative direction upwards (slots A14-A23) and finally leaves this 360° development to the right. In the simplest case, the lower spar ends after 360°, and the two upper spars are crossed out, so that the conductor structure repeats modulo 360°. In this case, one obtains a parallel/series circuit per 360° segment and impedance ratios, which come close to those of a classically wound stator for an asynchronous motor. In a common case, all three spars are drawn analogous to development of the rotor in the lower third of FIG. 35 until all the winding layers are traversed. The impedance of the purely parallel ladder-rungs is lower. The description of the ladder-rungs arrangements for the auxiliary line is analogous.

In general, one can implement the discussed ladder-rungs structures either on a carrier tape, that can be optionally removed at the winding of the motor (pure conveyor belt). In this case, the duplicated structure is realized as the front and back of one and the same tape. In this case, it is also possible to apply ferromagnetic layers (9) so that a stator is formed by simple winding of two such tapes, one each for phase A and phase B. For the rotor, only a single tape is needed. In high performance asynchronous motors, it is advantageous to realize the ladder-rungs as endless stamped parts, which are centrally folded in the longitudinal direction in the case of the stator windings. For the magnetic field guidance then usual stacks of sheet metal made of electrical sheet or molded parts made of ferrite are used for the stator or rotor.

Figure 36:
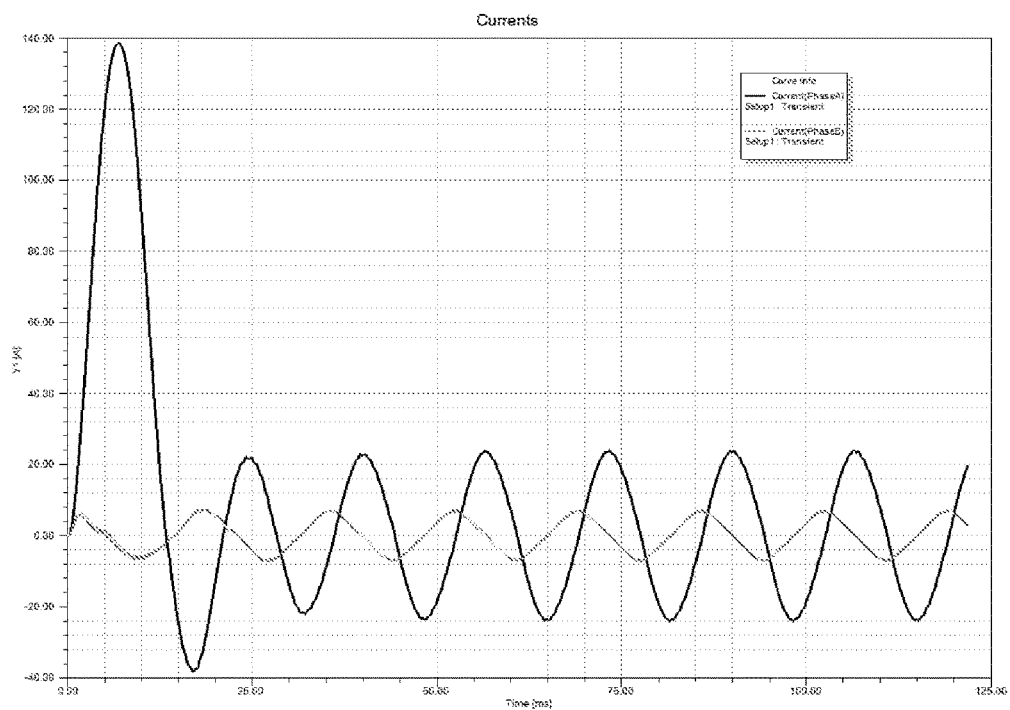
FIG. 36 illustrates the operation of a band wound asynchronous motor, the numerically determined transient current waveform of the two phases A and B.
Figure 37:
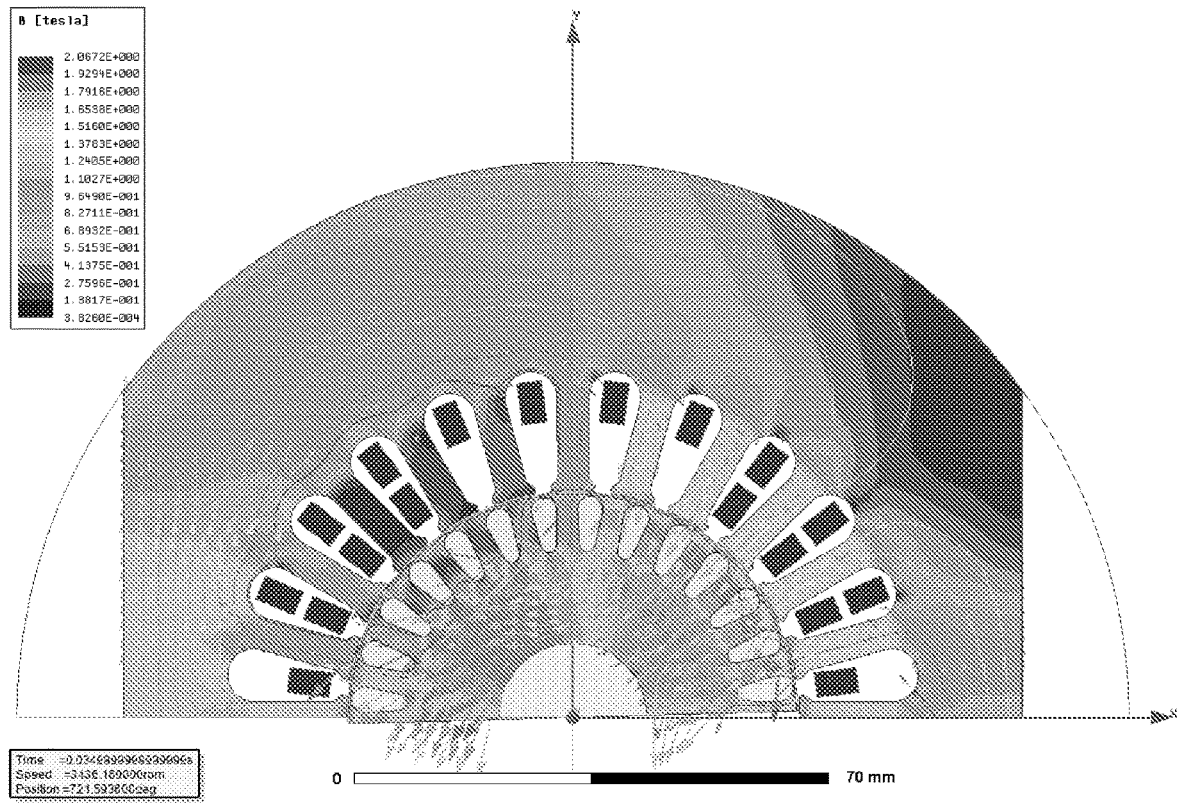
FIG. 37 shows, as an example, a two-strand induction motor.

To illustrate the operation of a band wound asynchronous motor, the numerically determined transient current waveform of the two phases A and B in FIG. 36 are used (seven 60-Hz periods) and a snapshot from the transient course of the vectorial electromagnetic induction for the instant of time t=35 ms.

I claim:

1. Inductance system as application in induction machines having two or more primary inductance arrangements as the stator (10) and at least one secondary inductance arrangement (11, 12) as a rotating or linearly driving unit, wherein the primary inductance arrangement (10) and the secondary inductance arrangement (11, 12) are configured as ladder-rungs arrangement comprising electrically conductive rungs (14, 14a-14c) and connecting them spars (15, 15a-15c), characterized in that the impedance of the spars (15, 15a-15c) in relation to the impedance of the rungs (14, 14a-14c) is of lower impedance and the impedance of a short-circuit measuring and/or driving arrangement built into the inductances system at the measuring terminals (i1, i21, i22) again is of even lower impedance and the sum of the induced rungs currents ($i_L/n$) in each rung (14, 14a-14c) is measurable at the measuring terminals (i1, i21, i22) and that the primary inductance arrangement (10) and the secondary inductance arrangement (11, 12) are arranged without crossing.

2. Inductance system according to claim 1, characterized in that the current flow of all induced rung currents ($i_L/n$) in each rung (14, 14a-14c) is directed at any time in the direction of the short-circuit measuring device or is directed away from it.

3. Inductance system according to claim 1, characterized in that the primary inductance arrangement (10) and/or the secondary inductance arrangement (11, 12) are configured as flat or as a flat rolled-up or as a planar ladder-rung arrangements.

4. Inductance system according to claim 1, characterized in that at least one of the rungs (14, 14a-14c) has only one winding turn.

5. Inductance system according to claim 1, characterized in that the inductance system comprises a housing (9) made of high-permeability magnetic material.

6. Inductance system according to claim 1, characterized in that the cross sections of the rungs (14, 14a-14c) are different from each other.

7. Inductance system according to claim 1, characterized in that the primary inductance arrangement (10) and the secondary inductance arrangement (11, 12) consists of conductive material with different kind of level of electric resistance depending on the material to be used for the rungs (14, 14a-14c) and/or cross section of the rungs (14, 14a-14c).

8. Inductance system according to claim 1, characterized in that the primary inductance arrangement (10) and/or the secondary inductance arrangement (11, 12) consists of different kinds of conductive metallic materials.

9. Inductance system according to claim 1, characterized in that the geometry for the inductance system in static, stationary or unsteady moving ladder-rungs arrangements by way of using computer-aided three-dimensional simulation tools can be determined virtually by calculation and optimization and validated as suitable for the particular application.

* * * * *